United States Patent
Seo et al.

(10) Patent No.: US 8,862,111 B2
(45) Date of Patent: Oct. 14, 2014

(54) MOBILE TERMINAL AND METHOD OF CONTROLLING THE SAME

(75) Inventors: Hyewon Seo, Seoul (KR); Songhee Han, Seoul (KR); Yongjun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 653 days.

(21) Appl. No.: 13/151,663

(22) Filed: Jun. 2, 2011

(65) Prior Publication Data
US 2012/0231839 A1 Sep. 13, 2012

(30) Foreign Application Priority Data

Mar. 8, 2011 (KR) .......................... 10-2011-0020476

(51) Int. Cl.
G06F 3/0483 (2013.01)
G06F 3/01 (2006.01)
H04M 1/725 (2006.01)
G06F 3/0488 (2013.01)
G06F 3/0487 (2013.01)
G06F 1/16 (2006.01)
G06F 3/0346 (2013.01)
G06F 3/0482 (2013.01)

(52) U.S. Cl.
CPC ............ *G06F 3/0346* (2013.01); *G06F 3/0483* (2013.01); *G06F 3/017* (2013.01); *H04M 1/72569* (2013.01); *G06F 3/04886* (2013.01); *G06F 3/0488* (2013.01); *H04M 2250/12* (2013.01); *G06F 2203/04803* (2013.01); *G06F 3/04883* (2013.01); *G06F 3/0487* (2013.01); *H04M 2250/52* (2013.01); *G06F 2200/1637* (2013.01); *H04M 2250/10* (2013.01); *G06F 1/1694* (2013.01); *G06F 3/0482* (2013.01)
USPC ......................................... 455/418

(58) Field of Classification Search
CPC .......... H04M 2250/52; H04M 1/0212; H04M 1/0216; H04M 1/0222; H04M 1/0231; H04M 1/0239; H04M 1/0243; H04M 1/0245; H04M 2250/16; H04M 2250/22; H04M 1/0202; H04M 1/0233; H04M 1/0264
USPC ....................................... 455/556.1
See application file for complete search history.

(56) References Cited

U.S. PATENT DOCUMENTS

2010/0009700 A1* 1/2010 Camp et al. ................. 455/456.6
2011/0312374 A1* 12/2011 Chen et al. ................. 455/556.1

* cited by examiner

*Primary Examiner* — Kwasi Karikari
(74) *Attorney, Agent, or Firm* — Birch, Stewart, Kolasch, Birch, LLP

(57) ABSTRACT

A mobile terminal and a method of controlling the same are provided. The mobile terminal includes: a body; a sensing unit for acquiring a motion of the body; a camera provided in at least one side of the body to photograph an image; at least one display provided in at least one side of the body; and a controller for forming information related to at least one object included in the photographed image into a group according to the acquired motion and for controlling to display the information in the at least one display. Therefore, information is formed into a group and displayed according to a motion of a body and thus a state that can easily select necessary information can be provided.

17 Claims, 33 Drawing Sheets

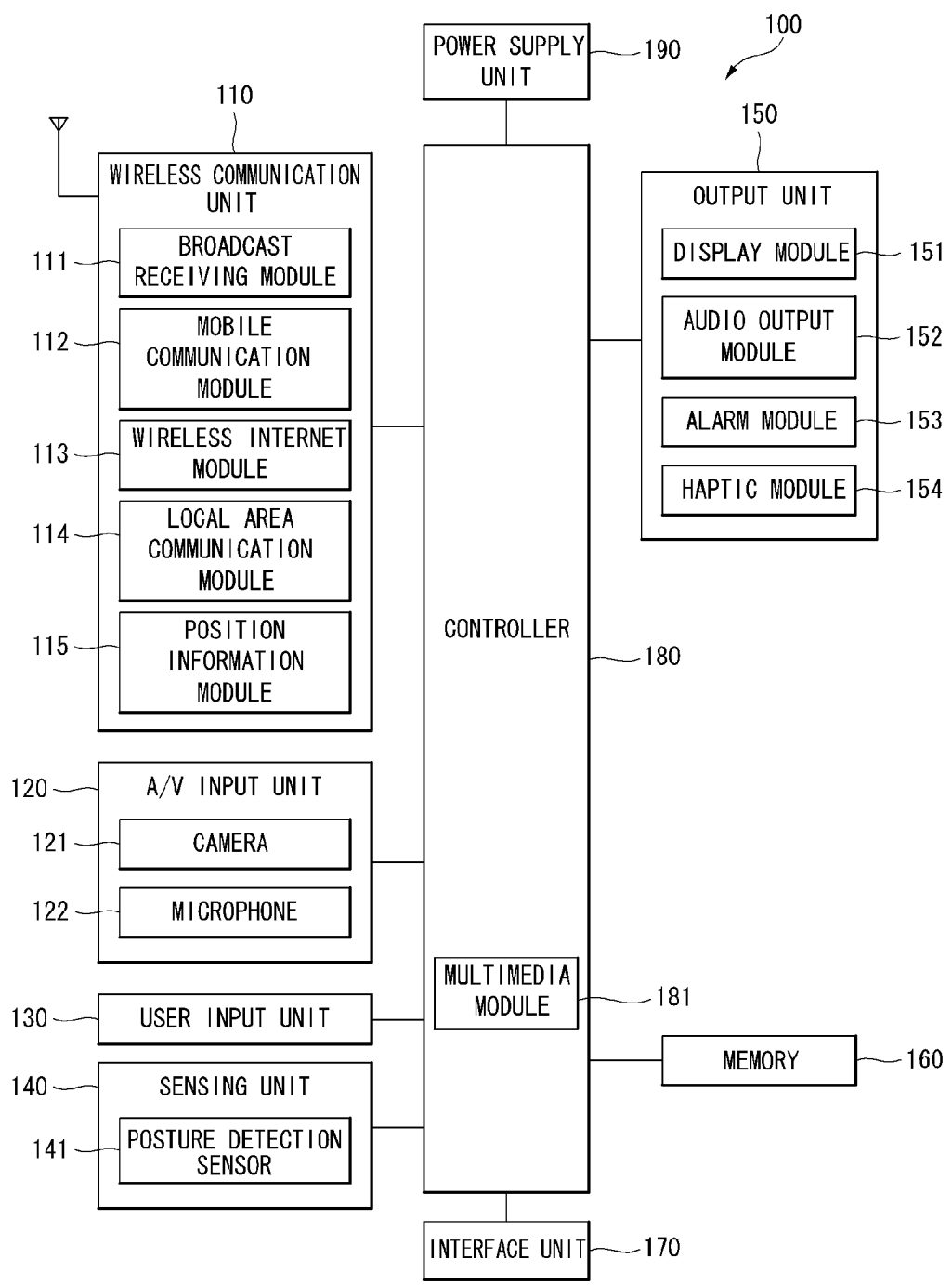

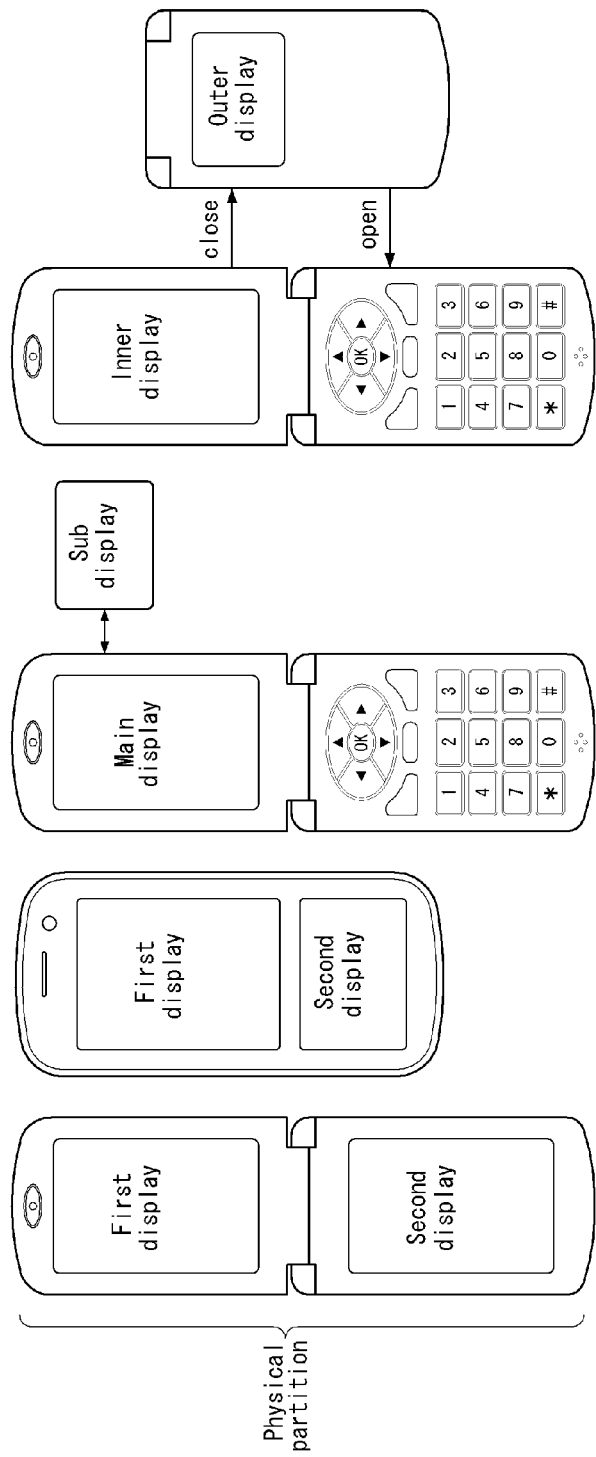

FIG. 14
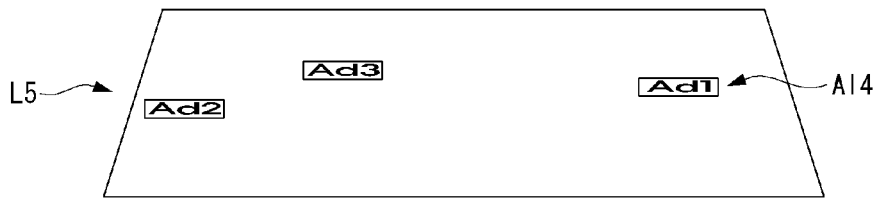
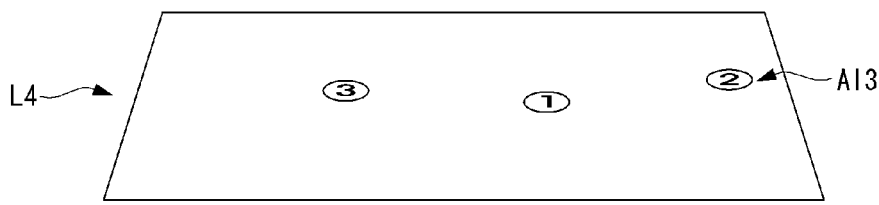
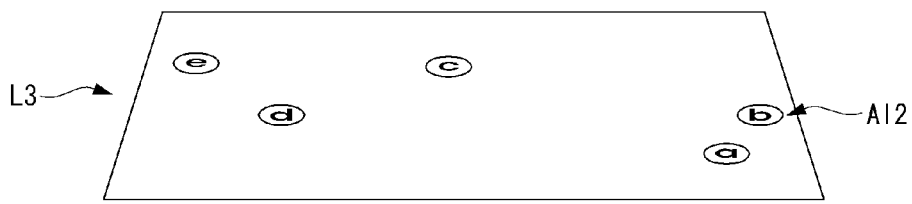
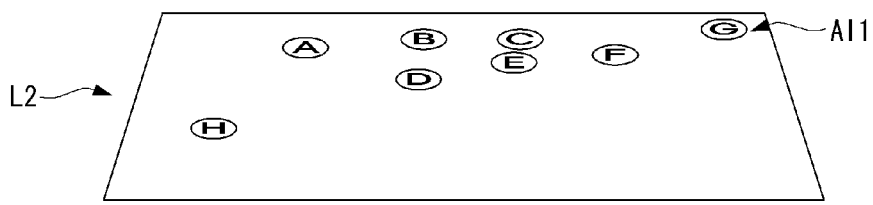
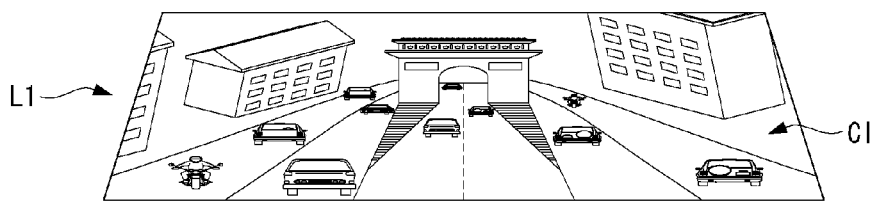

FIG. 18
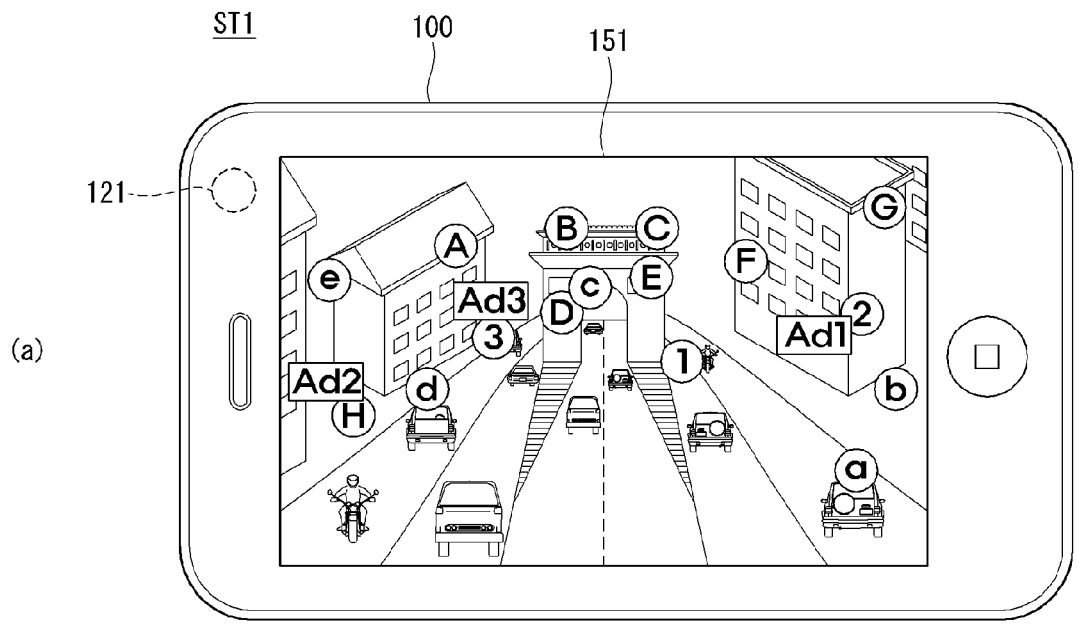
(a)
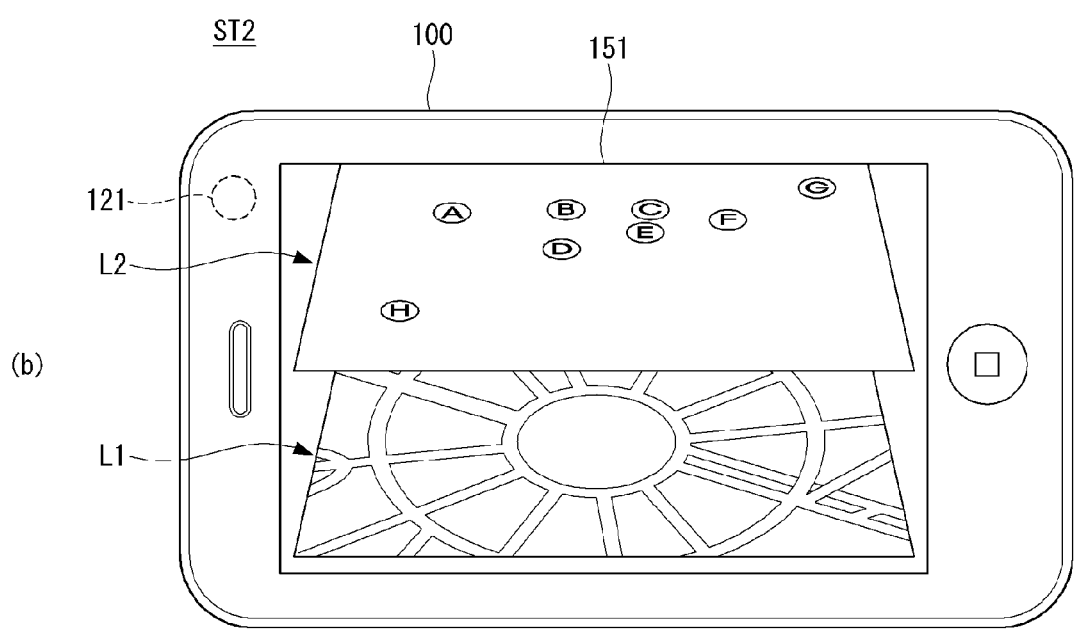
(b)

FIG. 23
(a)
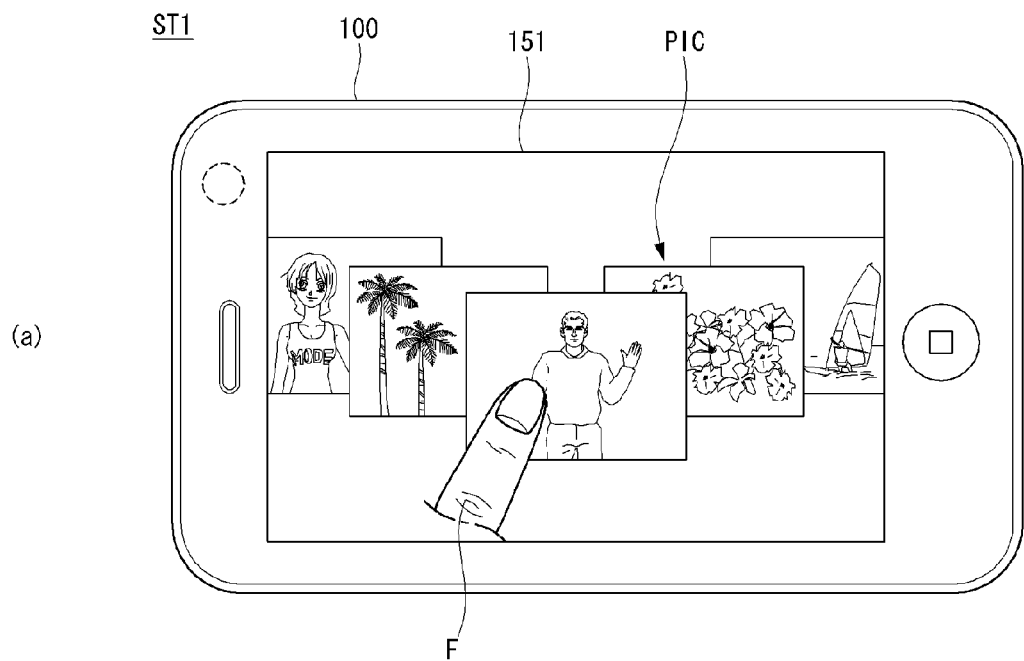
(b)
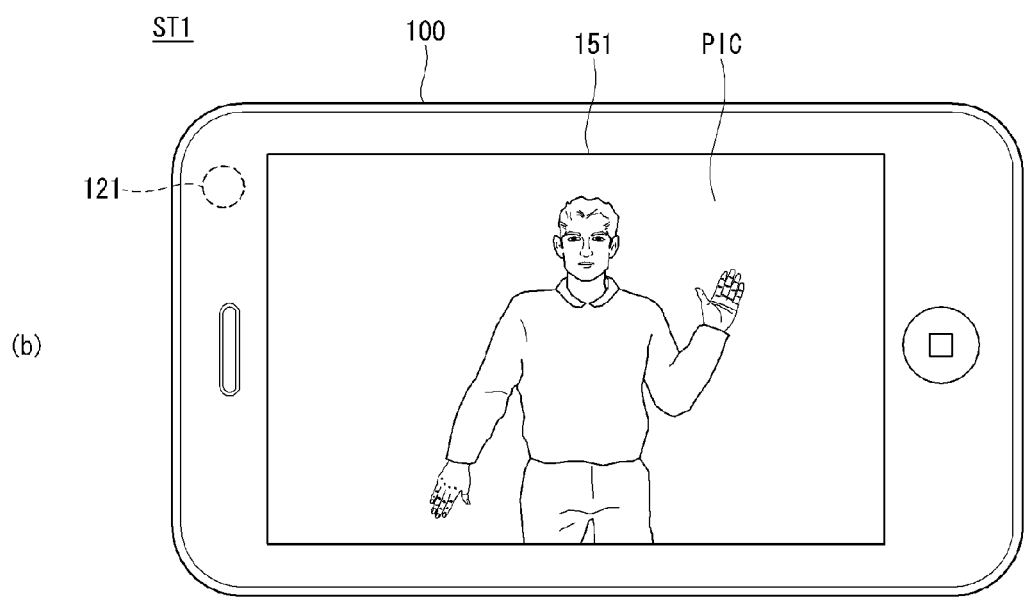

MOBILE TERMINAL AND METHOD OF CONTROLLING THE SAME

This application claims the benefit of Korean Patent Application No. 10-2011-0020476 filed on Mar. 8, 2011 which are hereby incorporated by reference.

BACKGROUND

1. Field

This documents relates to a mobile terminal and a method of controlling the same, and more particularly, to a mobile terminal and a method of controlling the same that can provide a state that can easily select necessary information by forming information into a group and displaying the information according to a motion of a body.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY

The present invention has been made in view of the above problems, and provides a mobile terminal and a method of controlling the same that can provide a state that can easily select necessary information by forming information into a group and displaying the information according to a motion of a body.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 1 is a block diagram of a mobile terminal according to an embodiment of the present invention;

FIGS. 2C and 2D illustrate forms of the mobile terminal and display screens according to various embodiments of the present invention;

FIGS. 13 and 14 are diagrams illustrating a layer for grouping and displaying information of FIG. 5;

FIGS. 18 and 19 are diagrams illustrating a process of displaying a layer according to a motion of a body of a mobile terminal;

FIGS. 23 and 24 are diagrams illustrating operation of a mobile terminal according to another embodiment of the present invention.

DETAILED DESCRIPTION

Figure 2A:
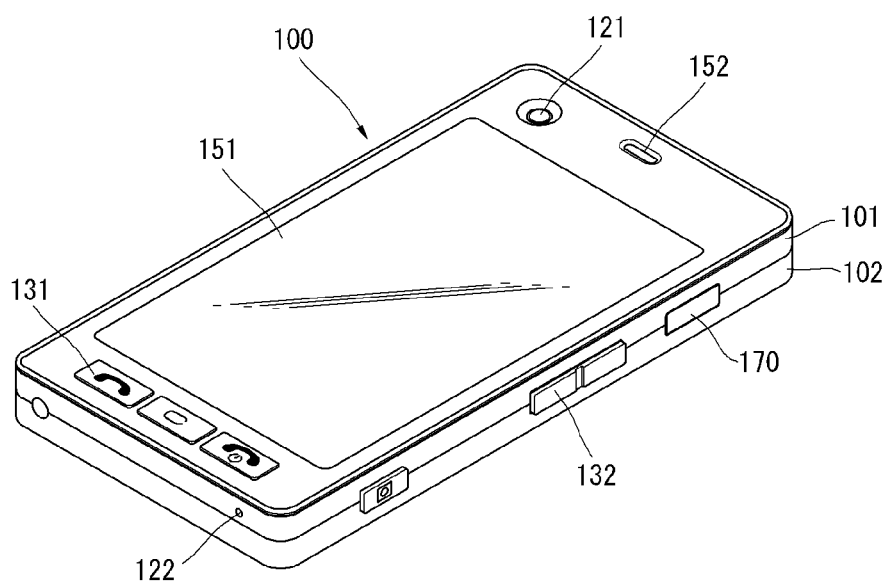
FIG. 2A is a front perspective view of the mobile terminal according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
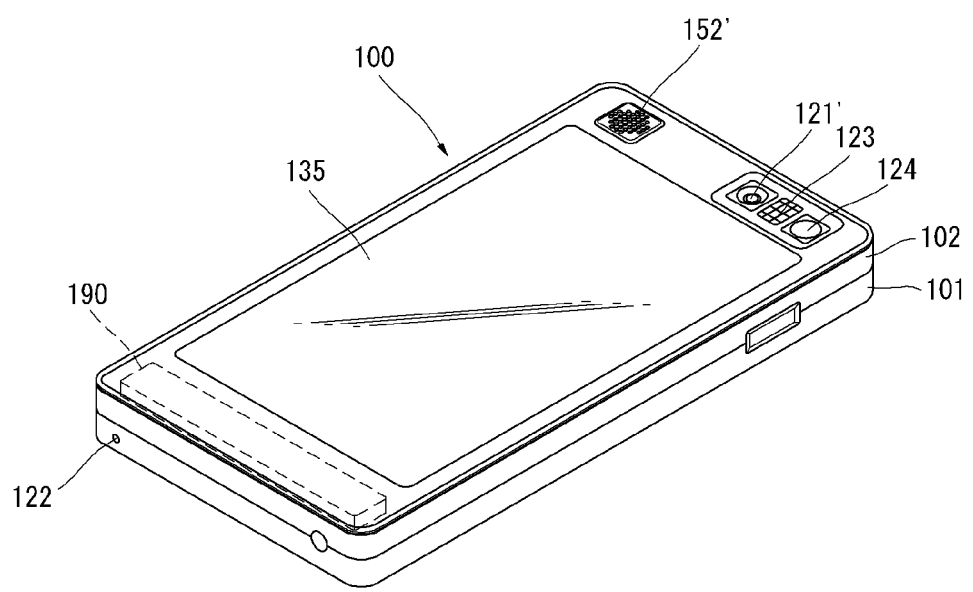
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 2D:
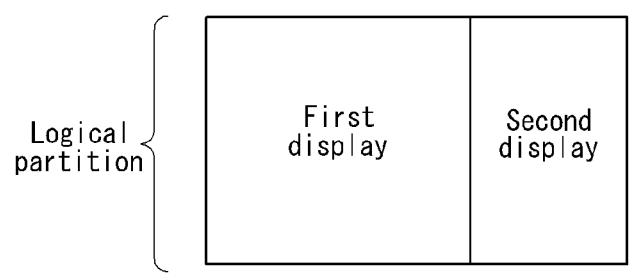

FIGS. 2C and 2D illustrate the mobile terminal 100 and the display unit 151 according to various embodiments of the present invention.

Referring to FIG. 2C, the display unit 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display unit 151 can include first and second displays which are logically separated from each other in a display panel, as illustrated in FIG. 2D.

Figure 3:
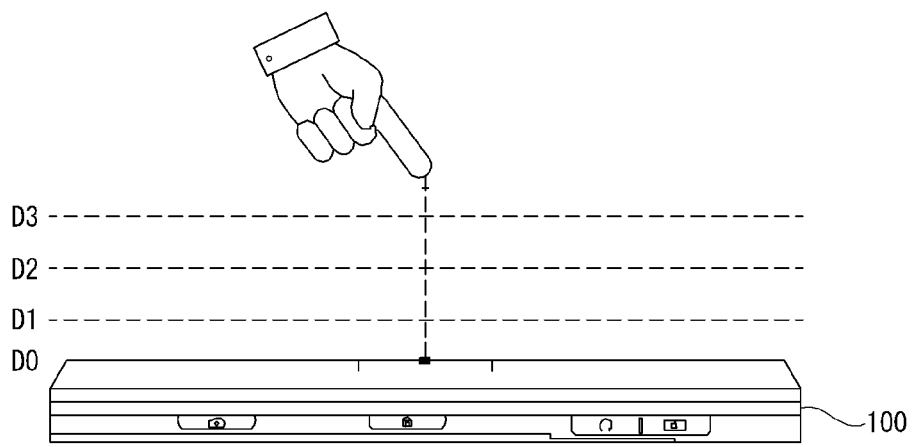
FIG. 3 is a conceptional view for explaining a proximity depth of a proximity sensor.

FIG. 3 is a conceptional view for explaining a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
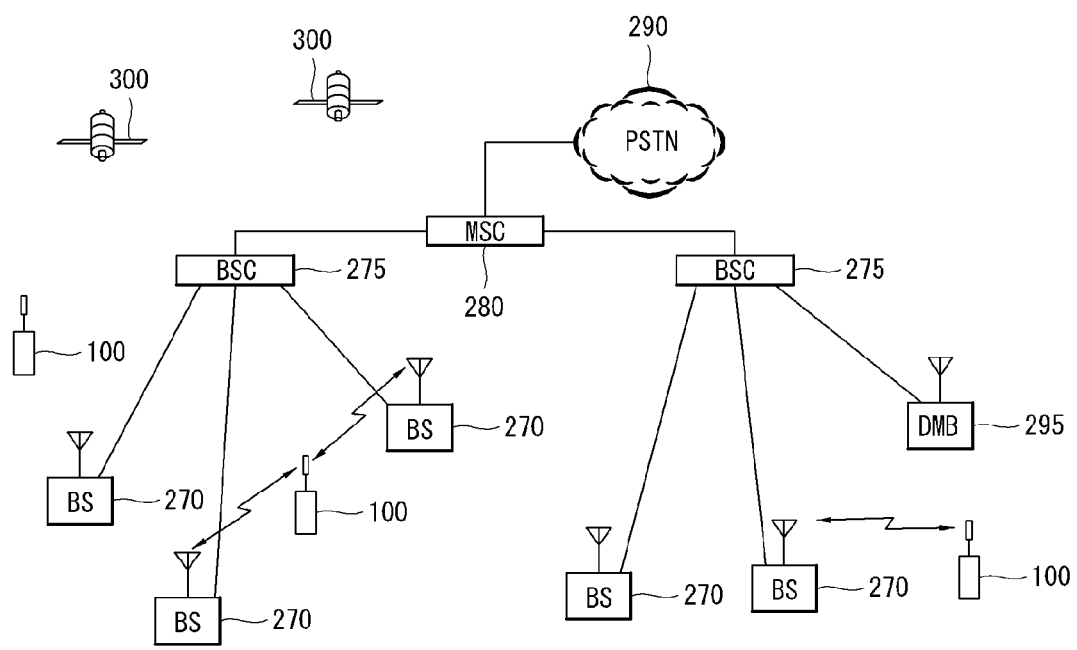
FIG. 4 illustrates a configuration of a CDMA wireless communication system communicating with the mobile terminal shown in FIG. 1.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
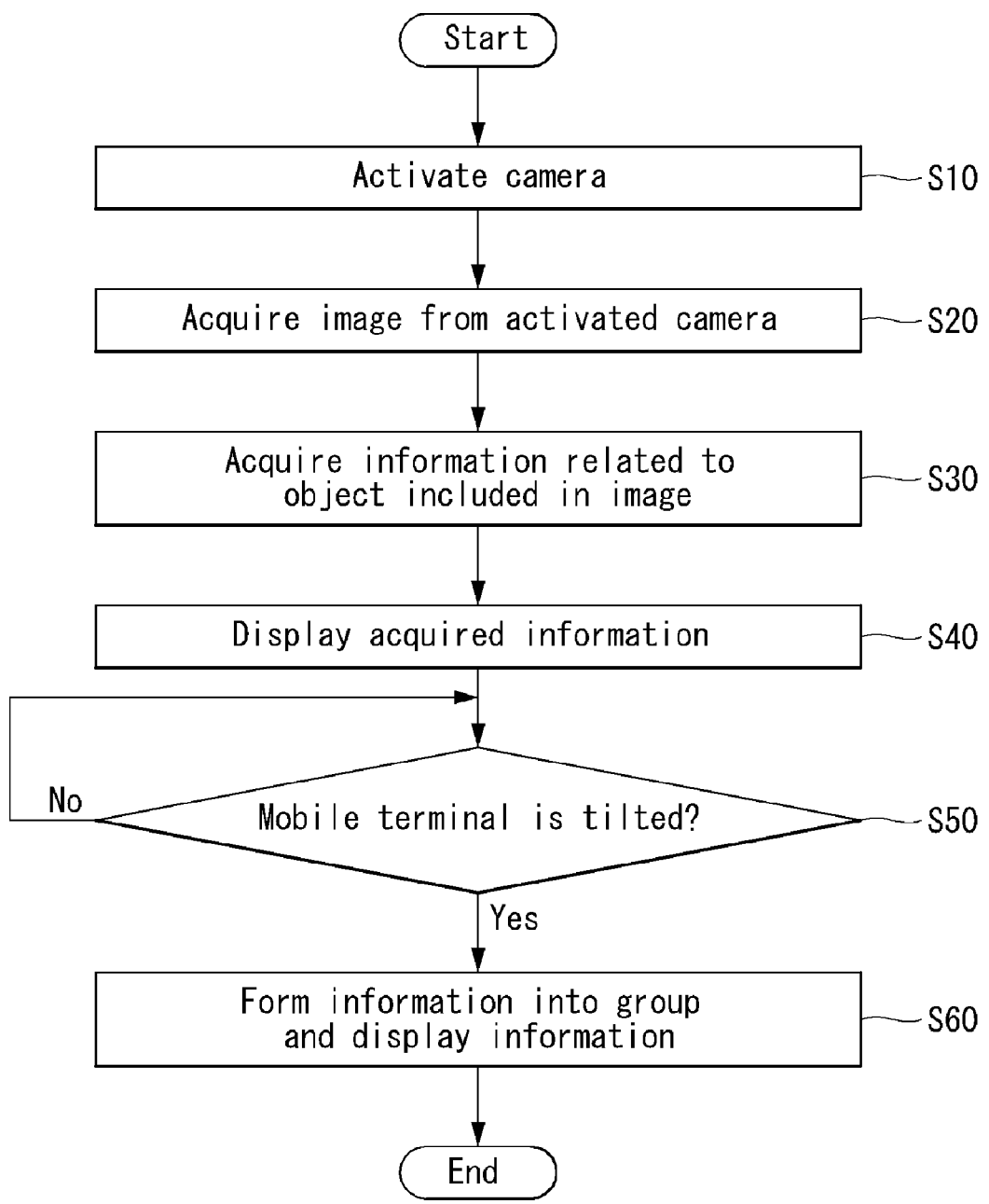
FIG. 5 is a flowchart illustrating an operation process of a mobile terminal according to an exemplary embodiment of the present invention.

FIG. 5 is a flowchart illustrating an operation process of a mobile terminal according to an exemplary embodiment of the present invention.

As shown in FIG. 5, the controller 180 of the mobile terminal 100 according to an exemplary embodiment of the present invention activates the camera 121 (S10).

The camera 121 is disposed at a front surface or a rear surface of the mobile terminal 100. As describe above, the camera disposed at a front surface or a rear surface of the mobile terminal 100 is designated by reference numeral 121 or 121'. However, for convenience of description, the camera is designated by reference numeral 121. However, such a designation does not limit the camera 121 at a specific position.

The camera 121 is activated or inactivated by a user's manipulation or a control operation of the controller (180 of FIG. 1). For example, the controller 180 may activate or inactivate the camera 121 according to a sensing value of the posture detection sensor (141 of FIG. 1) that can detect a posture of the mobile terminal 100. The posture detection sensor 141 is included in the sensing unit (140 of FIG. 1) and is formed as a combination of one or two or more of an acceleration sensor, a gravity sensor, and a terrestrial magnetism sensor. The controller 180 determines a directional direction of a surface at which the camera 121 is positioned at the mobile terminal 100 through the posture detection sensor 141 formed as a combination of one or two or more of an acceleration sensor, a gravity sensor, and a terrestrial magnetism sensor. For example, the controller 180 may determine whether a position surface of the camera 121 of the mobile terminal 100 faces toward the ground or toward the front side or the rear side parallel to the ground.

If the camera 121 faces toward the ground, the controller 180 inactivates the camera 121 and stops photographing. Further, if the camera 121 faces toward the front side or the rear side parallel to the ground, the controller 180 activates the camera 121 and starts photographing. Because the controller 180 controls activation/inactivation of the camera 121 according to a posture detected through the posture detection sensor 141, the user can perform optimized photographing without a separate manipulation. Furthermore, by operating the camera 121 only in an optimized moment, battery consumption of the mobile terminal 100 can be minimized.

When the camera 121 is activated, the controller 180 acquires an image from the activated camera 121 (S20).

When the camera 121 is activated, the controller 180 acquires an image from the camera 121. That is, photographing is performed using the camera 121. An image photographed by the camera 121 is displayed in the display 151. For example, when the user activates the camera 121 toward the front side, an image acquired by the camera 121 is displayed in real time in the display 151. Therefore, when the user changes a directional direction of the mobile terminal 100, an image photographed by the camera 121 is changed and thus an image displayed in the display 151 is also changed.

The controller 180 acquires information related to an object included in an image (S30).

The object may be included in an image photographed by the camera 121. For example, the object may be an image of a photographed building, road, etc.

The controller 180 acquires position information of the photographed object. For example, the position information may be an absolute coordinate of a specific object such as a longitude and a latitude and a relative coordinate such as a direction and a distance of the mobile terminal 180 based on a present position.

When position information of the photographed object is acquired, the controller 180 acquires information related to the object based on the position information. The information related to the object may be various uploaded information of a specific object, for example, information uploaded using a social network service (SNS). The information uploaded by an SNS includes an upload position of the information and information tagged at a specific location.

The information related to the object can be acquired from another terminal or a server, for example, may be directly acquired from a user of another terminal or may be acquired from a server that integrates information uploaded by various users.

When information related to an object is acquired, the acquired information is displayed (S40).

As various activities using the mobile terminal 100 increases, an amount of information related to a specific object also remarkably increases. For example, as an SNS is widely used, an amount of information tagged to a specific object increases.

Increase in the tagged information means increase in information to be displayed in the display 151. When all the acquired information is displayed one time, the user cannot quickly recognize desired information. Therefore, in the mobile terminal 100 according to an exemplary embodiment of the present invention, even in an environment in which a large amount of information is displayed, the user can intuitively and quickly recognize desired information, as described in detail in a related portion.

The controller 180 determines whether the mobile terminal 100 is tilted (S50), if the mobile terminal 100 is tilted, information is formed into a group and is displayed (S60).

The posture detection sensor 141 detects a tilt of the mobile terminal 100. For example, the posture detection sensor 141 detects whether the camera 121 of the mobile terminal 100 faces toward the ground, faces toward the front side, which is a direction perpendicular to the ground, or is tilted by a predetermined angle to the ground.

If the mobile terminal 100 is tilted, information is formed into a group and is displayed (S60).

A process of forming information into a group may be a process of selectively displaying information requested by the user among a large amount of information. For example, when the user wishes to see only information of a building, only information uploaded by the user's friend, or only information uploaded by the user, each information can be set into different groups. That is, the information of a building can be formed into a first group, the information uploaded by the user's friend can be formed into a second group, and the information uploaded by the user can be formed into a third group.

In the mobile terminal 100 according to an exemplary embodiment of the present invention, a process of forming and displaying information into a group is related to a tilt of the mobile terminal 100. For example, it may be easily selected whether to display information of which group using a tilt degree of the mobile terminal 100. This will be described in detail in a related portion.

Figure 6:
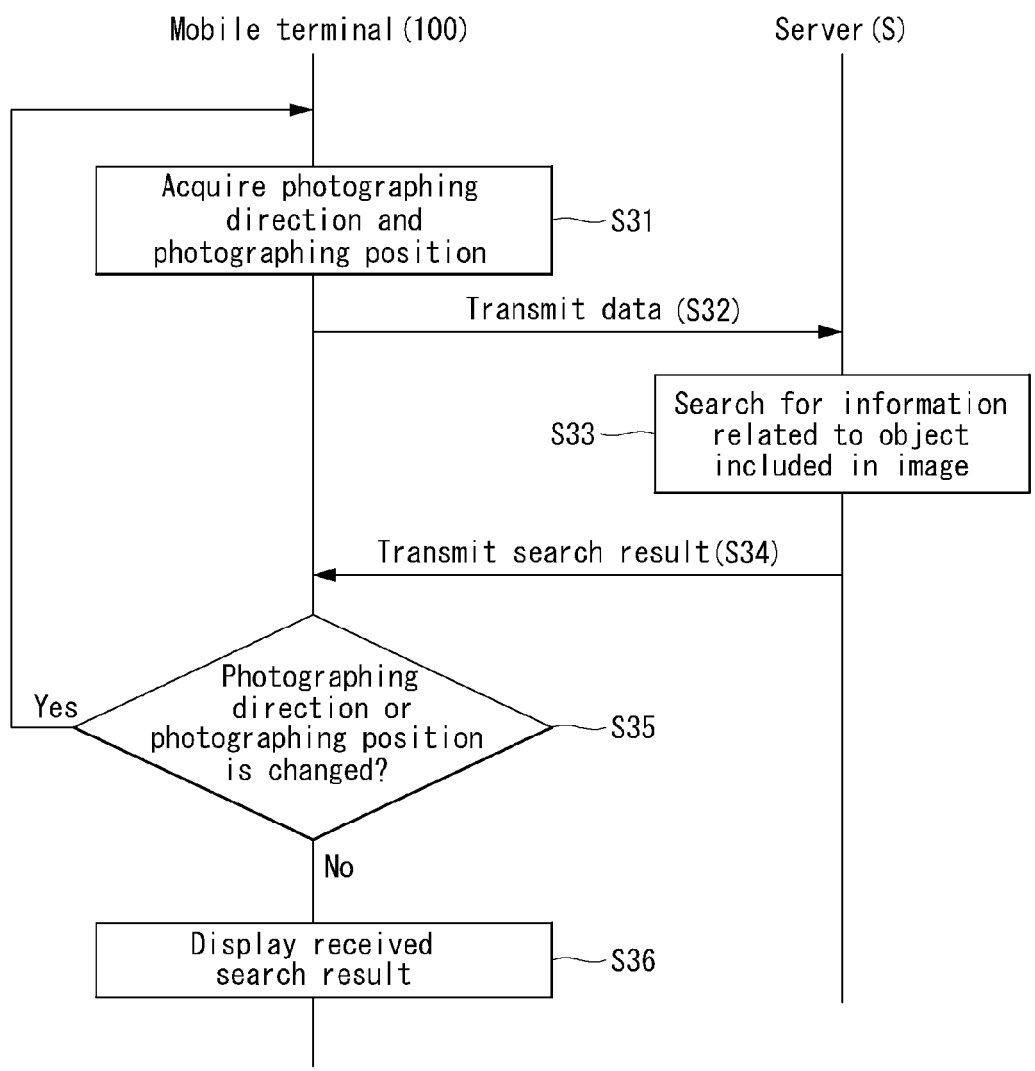
FIG. 6 is a message flow diagram illustrating an information exchange process between a server and the mobile terminal of FIG. 5.

FIG. 6 is a message flow diagram illustrating an information exchange process between a server and the mobile terminal of FIG. 5.

As shown in FIG. 6, step (S30 of FIG. 5) of acquiring information related to an object included in an image includes step (S31) of acquiring a photographing direction and a photographing position.

The photographing direction and the photographing position may be a ground of determining an object photographing using the camera 121. That is, through the position and the direction of the camera 121, an object positioned at the direction can be determined, and a range of information to be acquired can be specified.

When the photographing direction and the photographing position are acquired, the mobile terminal 100 transmits the data to the server S (S32).

The server S, having received the data searches for information related to an object included in an image (S33).

The server S collects various information from various other terminals or other servers and stores the various information in a database. For example, the server S may store data in which various users upload using an SNS.

The server S searches for data based on the photographing direction and the photographing position. For example, when the user photographs the north at a location A, the server S searches for data uploaded in a north direction based on the location A.

When data is found, the server S transmits a search result to the mobile terminal 100 (S34).

When the search result is received, the controller 180 determines whether the photographing direction or the photographing position is changed (S35).

Because the camera 121 is installed in the mobile terminal 100, a photographing position and/or direction of the mobile terminal 100 can be frequently changed. Therefore, it is determined whether the photographing position and/or direction are/is changed, if the photographing position and/or direction are/is changed, a process of searching for new information is performed.

If the photographing position and/or direction are/is not changed, the controller 180 controls to display the received search result (S36).

The received search result is displayed at a position of a corresponding object. For example, acquired information of a building A included in the photographed image is displayed at a corresponding position of the building A included in the photographed image.

When overlapping the acquired image with an image photographed by the camera 121 and displaying the image, an augmented reality (AR) scheme can be used. That is, acquired information is integrally formed and displayed with the image photographed by the camera 121. When information is displayed by applying an AR scheme, the user can more intuitively know desired information. However, when an amount of information to display using an AR scheme is very much, the user cannot easily find desired information. Therefore, the mobile terminal 100 according to an exemplary embodiment of the present invention can form information into a group according to an attribute and selectively display only information corresponding to a specific group. In this case, the mobile terminal 100 can enter to a mode of selecting a specific group through an action of tilting the mobile terminal 100.

Figure 7:
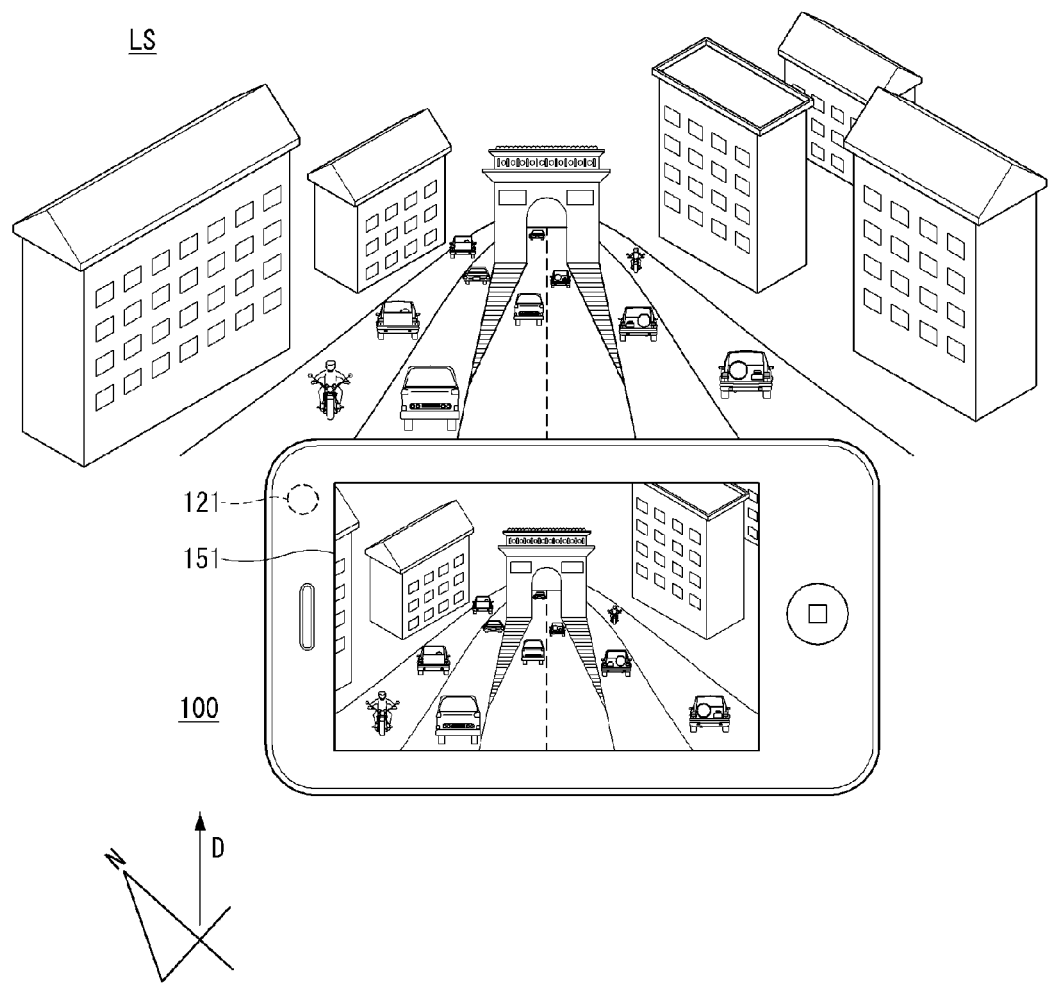
FIG. 7 is a diagram illustrating a state of photographing using a camera in the mobile terminal of FIG. 5.
Figure 8:
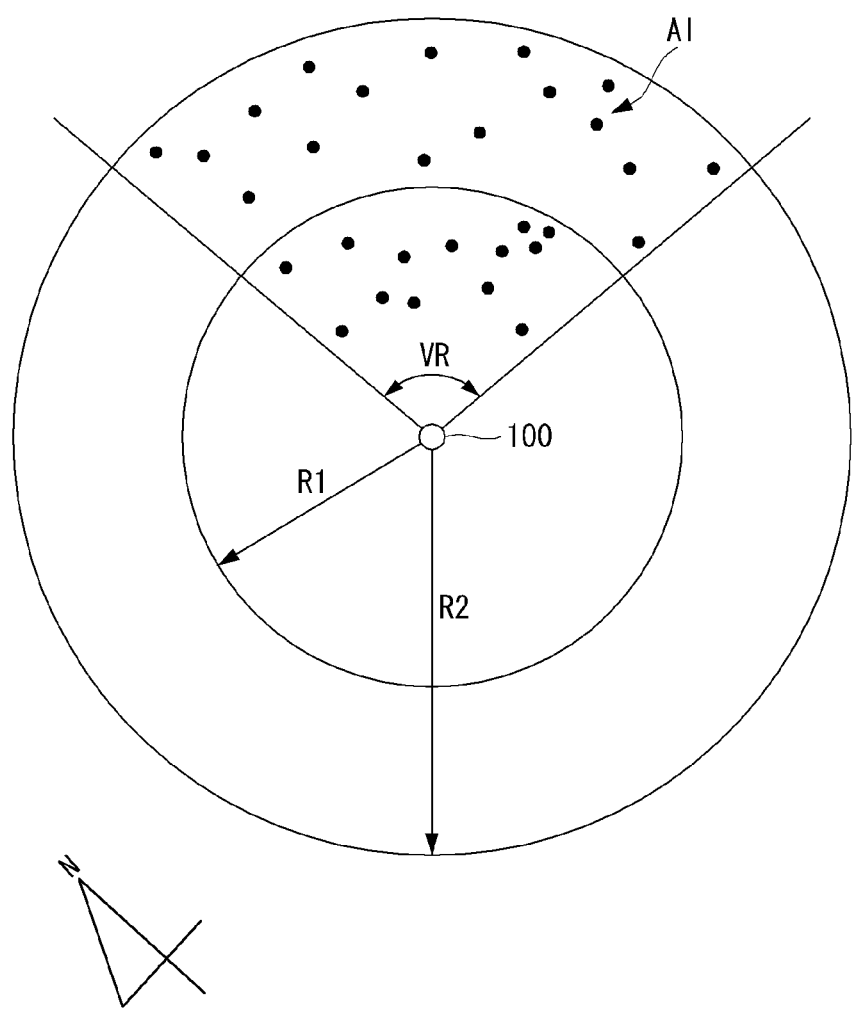
FIG. 8 is a diagram illustrating distribution of information existing within a photographing area of a mobile terminal in the state of FIG. 7.
Figure 9:
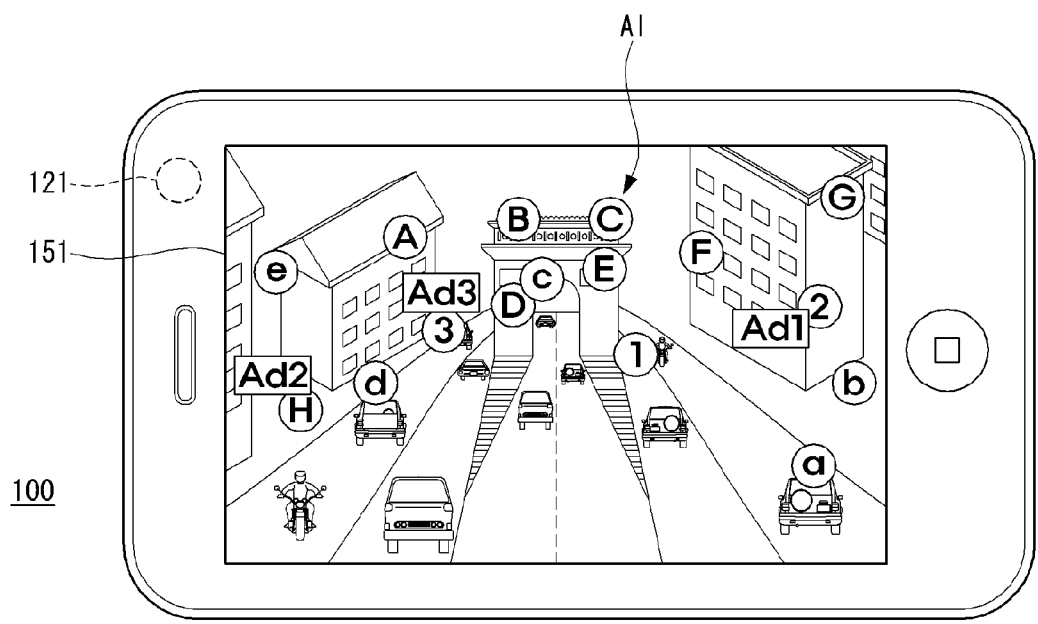
FIG. 9 is a diagram illustrating a state where information is overlapped and displayed in an image photographed in the mobile terminal of FIG. 7.

FIG. 7 is a diagram illustrating a state of photographing using a camera in the mobile terminal of FIG. 5, FIG. 8 is a diagram illustrating distribution of information existing within a photographing area of a mobile terminal in the state of FIG. 7, and FIG. 9 is a diagram illustrating a state where information is overlapped and displayed with an image photographed in the mobile terminal of FIG. 7.

As shown in FIGS. 7, 8, and 9, the mobile terminal 100 according to an exemplary embodiment of the present invention can acquire information corresponding to each point of an outside scene LS photographed by the camera 121 and display the information in the display 151.

As shown in FIG. 7, the controller 180 controls the display 151 to display the outside scene LS photographed by the camera 121. When photographing of the outside scene LS is started, the controller 180 starts to acquire information related to an object through the radio communication unit 100. That is, the controller 180 transmits data such as a photographing direction and a photographing position to the server (S of FIG. 6) and acquires information related to a presently photographing object.

As shown in FIG. 8, a large quantity of information AI may exist in a photographing range VR of the camera 121 installed in the mobile terminal 100 based on a present position of the mobile terminal 100. The information AI may be data in which a user of another terminal uploads at a specific position using an SNS.

The controller 180 selects a range of information AI to be acquired and displayed from a large quantity of information AI. For example, the controller 180 may acquire and display data related to information AI within a specific radius of a first radius R1 and a second radius R2 at a present position of the mobile terminal 100. In this case, the controller 180 controls to display a range to display the information AI acquired from the image displayed in FIG. 7.

As shown in FIG. 9, the controller 180 controls to display information AI related to an object included in a photographed image based on a present position of the mobile terminal 100. It is exemplified that the information AI displayed in the following figures as well as FIG. 9 corresponds to a following case. That is, an English upper case letter indicates information of a specific location, an English lower case letter indicates information uploaded by a user of another terminal having a relationship with a user of the mobile terminal 100 through an SNS, numerals indicate information uploaded by the user of the mobile terminal 100, and contents within a quadrangle indicate advertisement.

When the controller 180 acquires and controls to display information AI, a large quantity of information AI may exist. When the controller 180 controls the display 151 to display a large quantity of information, some information AI is overlapped and thus it may be difficult for the user to check the contents. Furthermore, when a large quantity of information AI is displayed, it may be difficult for the user to check desired information. A method of controlling the mobile terminal 100 according to an exemplary embodiment of the present invention includes a method of more effectively selecting and displaying a group of desired information when a large quantity of information AI is displayed.

Figure 10:
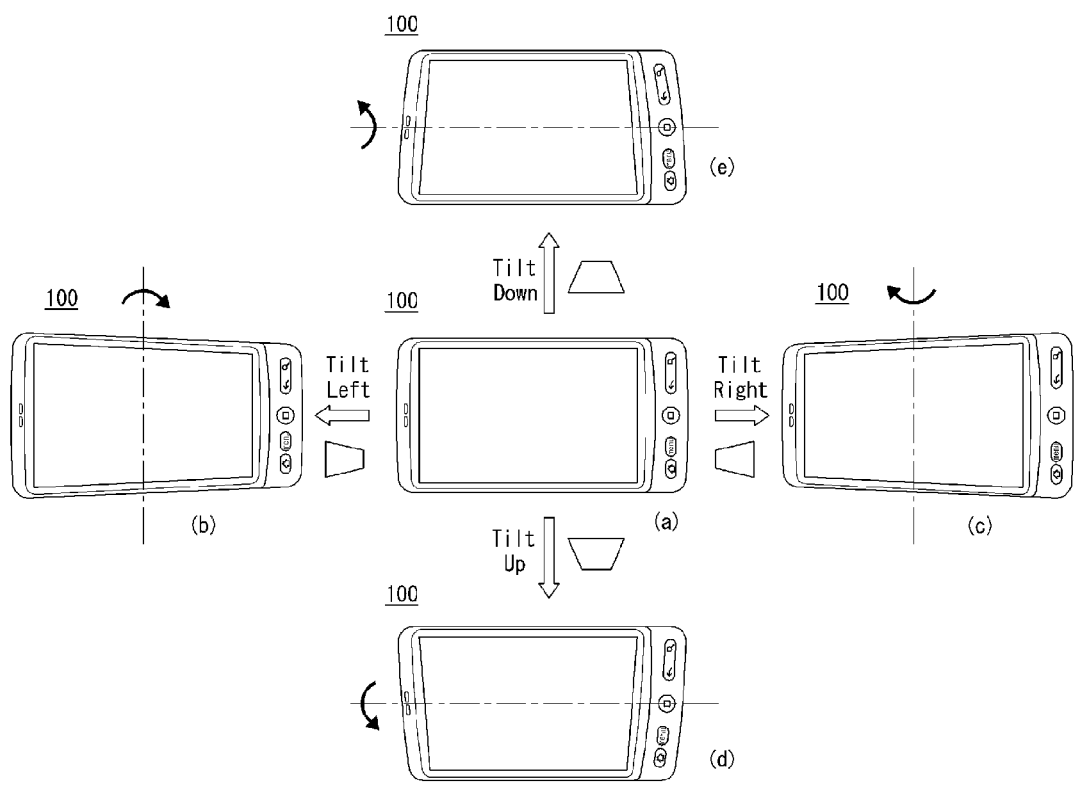
FIGS. 10 and 11 are diagrams illustrating a motion of a body of the mobile terminal of FIG. 5.
Figure 11:
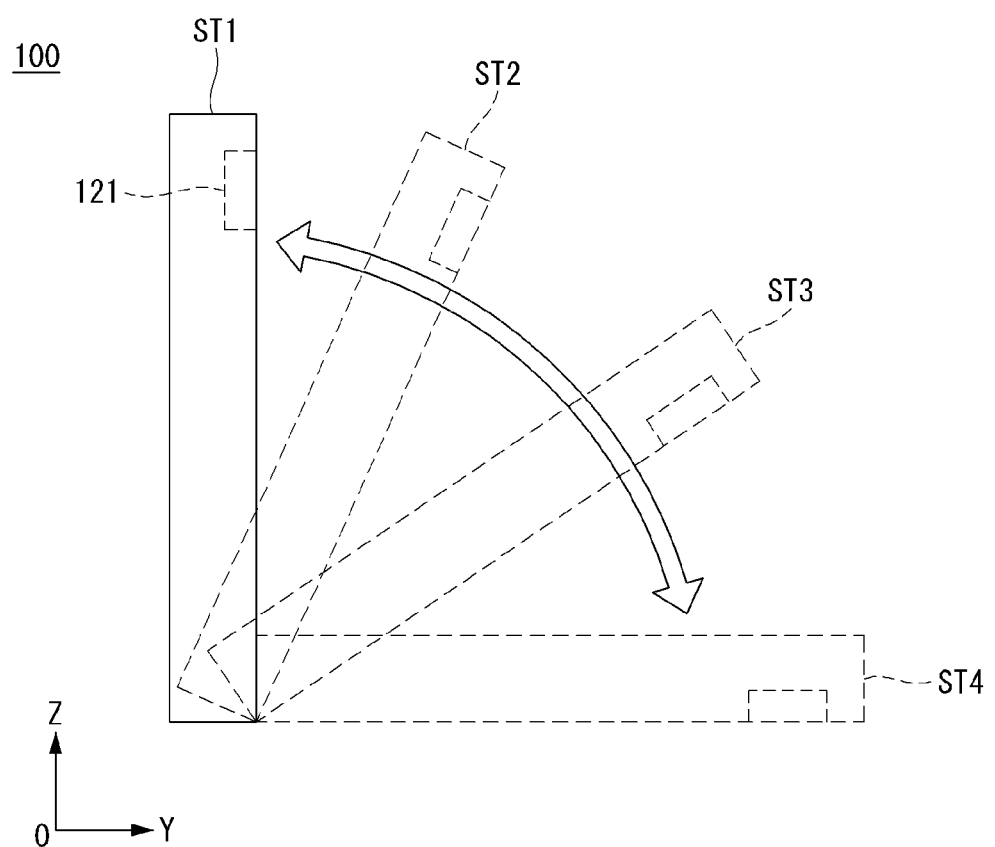

FIGS. 10 and 11 are diagrams illustrating a motion of a body of the mobile terminal of FIG. 5.

As shown in FIGS. 10 and 11, the mobile terminal 100 according to an exemplary embodiment of the present invention can form desired information into a group through an action of tilting the body of the mobile terminal 100 in a predetermined direction. Because information can be formed into a group by only an action of tilting the body of the mobile terminal 100, user convenience of a manipulation of the mobile terminal 100 can be improved.

As shown in FIG. 10(a), the mobile terminal 100 is positioned parallel to a specific reference surface.

As shown in FIG. 10(b), the user can perform an action of lifting the left side of the mobile terminal 100. That is, the user can perform an action of lifting the left side and lowering the right side based on a vertical central axis of the mobile terminal 100. Hereinafter, such an action is referred to as 'tilt left'.

As shown in FIG. 10(c), the user can perform an action of lifting the right side of the mobile terminal 100. That is, the user can perform an action of lifting the right side and lowering the left side based on a vertical central axis of the mobile terminal 100. Hereinafter, such an action is referred to as 'tilt right'.

As shown in FIG. 10(d), the user can perform an action of lifting an upper part of the mobile terminal 100. That is, the user can perform an action of lifting an upper part and lowering a lower part based on a horizontal central axis of the mobile terminal 100. Hereinafter, such an action is referred to as 'tilt up'.

As shown in FIG. 10(e), the user can perform an action of lifting a lower part of the mobile terminal 100. That is, the user can perform an action of lifting a lower part and lowering an upper part based on a horizontal central axis of the mobile terminal 100. Hereinafter, such an action is referred to as 'tile down'.

As shown in FIGS. 10(b) to 10(e), the user can perform an action of tilting a body of the mobile terminal 100 in a specific direction, and such a motion is detected by the posture detection sensor 141. The posture detection sensor 141 may be nine axis sensors having an acceleration sensor, a terrestrial magnetism sensor, and a gravity sensor for detecting a change amount based on each of three axes. A user's manipulation of the body of the mobile terminal 100 can be more accurately detected by nine axis posture detection sensors 141.

As shown in FIG. 11, a tilt down action of the body of the mobile terminal 100 can be divided in detail.

A state of the mobile terminal 100 is divided into a first state ST1 to a fourth state ST4 according to an angle of the mobile terminal 100 to the ground. That is, the mobile terminal 100 can be positioned in various angles from the first state ST1 of standing perpendicular to the ground to the fourth state ST4 of being put parallel to the ground.

When the mobile terminal 100 is in the first state ST1, the controller 180 activates the camera 121 and photographs an outside scene LS toward the front side of the mobile terminal 100. When the mobile terminal 100 is in the second to fourth states ST2 to ST4 or in the fourth state ST4, the controller 180 inactivates the camera 121. That is, only when the mobile terminal 100 is in a state appropriate for photographing, the controller 180 activates the camera 121, thereby minimizing battery consumption.

When the mobile terminal 100 is in the second to fourth states ST2 to ST4 or in the fourth state ST4, the controller 180 provides an environment that can select information AI to display. That is, by forming and displaying a large quantity of information AI into a group according to a predetermined reference, only desired information requested by the user can be selectively displayed.

The controller 180 considers a time period sustained in a specific angle as well as a tilt state of the body of the mobile terminal 100. For example, when the mobile terminal 100 is tilted in a specific angle for a specific time period or more, the mobile terminal 100 performs a specific operation according to the present exemplary embodiment.

Figure 12:
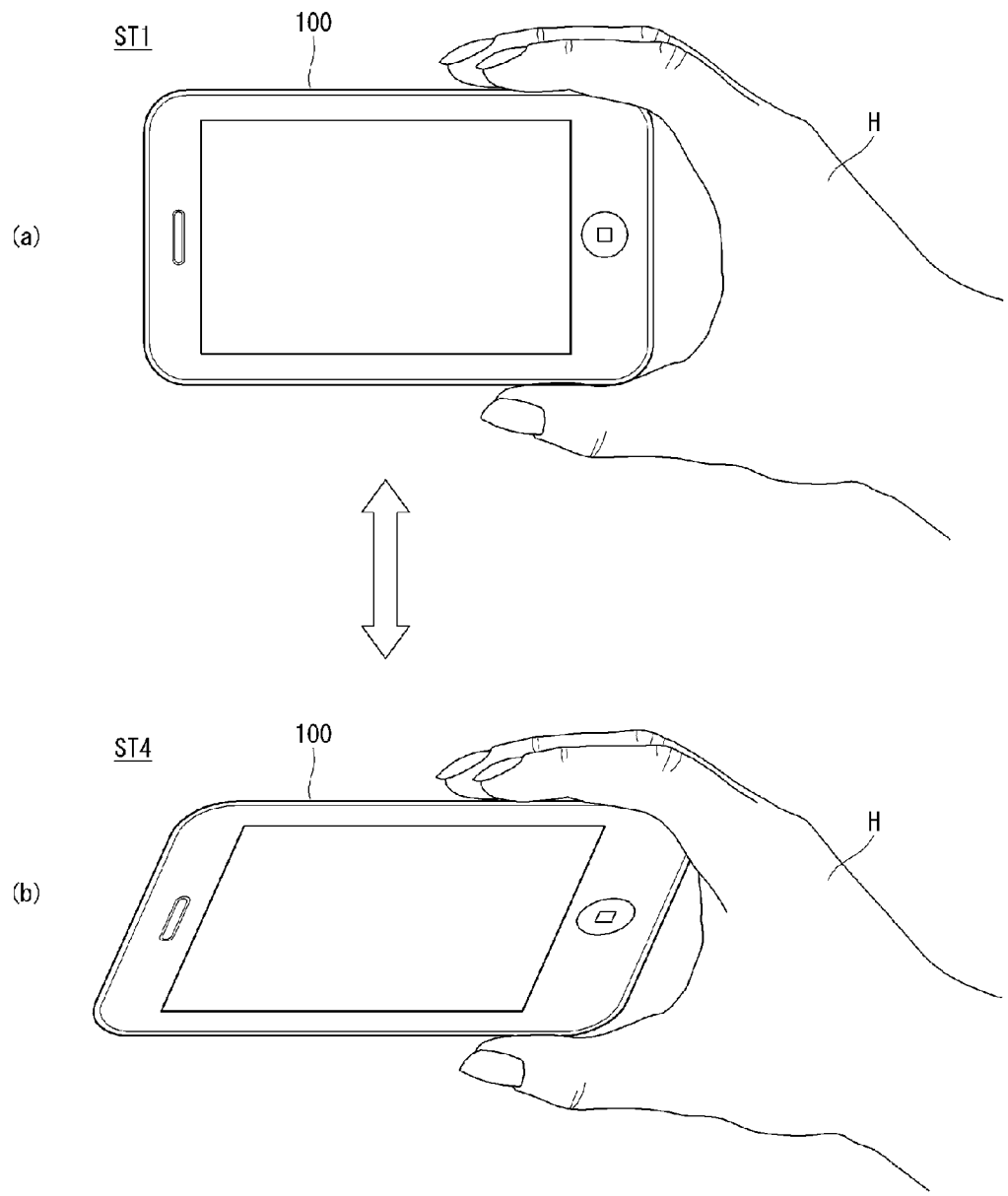
FIG. 12 is a diagram illustrating a motion of a body of the mobile terminal of FIG. 5.

FIG. 12 is a diagram illustrating a motion of a body of the mobile terminal of FIG. 5.

As shown in FIG. 12(a), the user can allow the mobile terminal 100 to be in the first state ST1 of photographing the front side while holding the mobile terminal 100 with a hand H.

As shown in FIG. 12(b), the user can allow the mobile terminal 100 to be in the fourth state ST4 of facing toward the ground while holding the mobile terminal 100 with a hand H.

The first state ST1 and the fourth state ST4 can be mutually converted, and a plurality of states may exist between the first state ST1 and the fourth state ST4.

Figure 13:
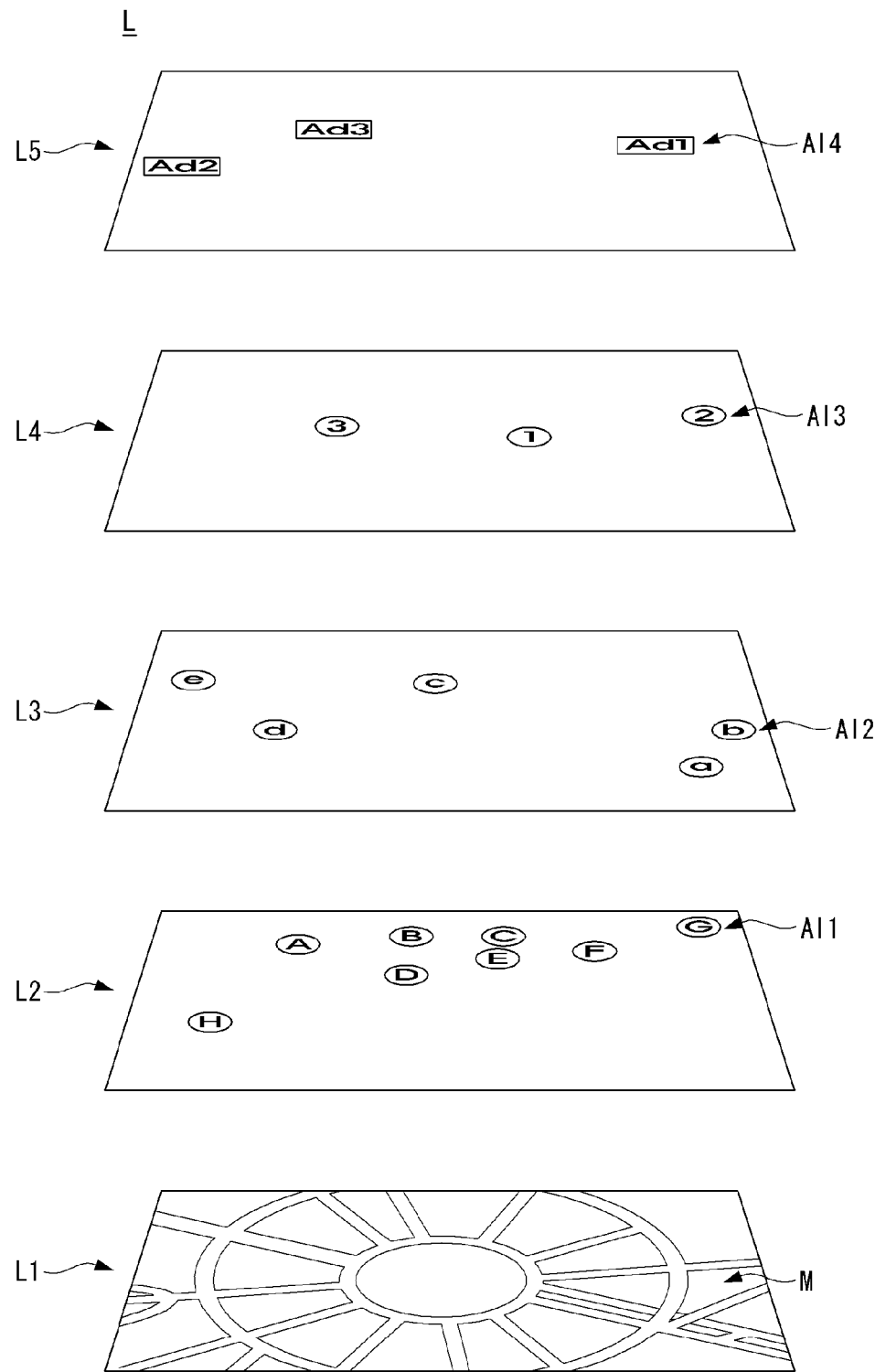

FIGS. 13 and 14 are diagrams illustrating a layer for grouping and displaying information of FIG. 5.

As shown in FIGS. 13 and 14, the controller 180 forms information AI into a group according to an attribute and controls to display each information AI in different layers L according to a kind thereof.

As shown in FIG. 13, the layer L includes first to fifth layers L1 to L5. Information AI formed into a group according to an attribute is disposed at each layer L.

A map M corresponding to the photographed outer scene (LS of FIG. 7) is displayed at the first layer L1.

First to four information AI1 to AI4 is sequentially displayed in the second layer L2 to the fifth layer L5. The first to four information AT1 to AI4 displayed in the second layer L2 to the fifth layer L5 is displayed to correspond to a location at which the first to four information AI1 to AI4 is tagged.

Each layer L can be displayed with a stereoscopic image. That is, due to stereo disparity, each layer L can be displayed so that the user of the mobile terminal 100 feels a sense of distance. A specific method of displaying each layer L with a stereoscopic image will be described in detail in a related portion.

As shown in FIG. 14, an image photographed by the camera 121 is displayed in the first layer L1. That is, unlike the map M of FIG. 13, a still image photographed by the camera 121 of the mobile terminal 100 is displayed in the first layer L1. As an image photographed by the user is displayed, the user can more intuitively know a position of the information AI.

Figure 15:
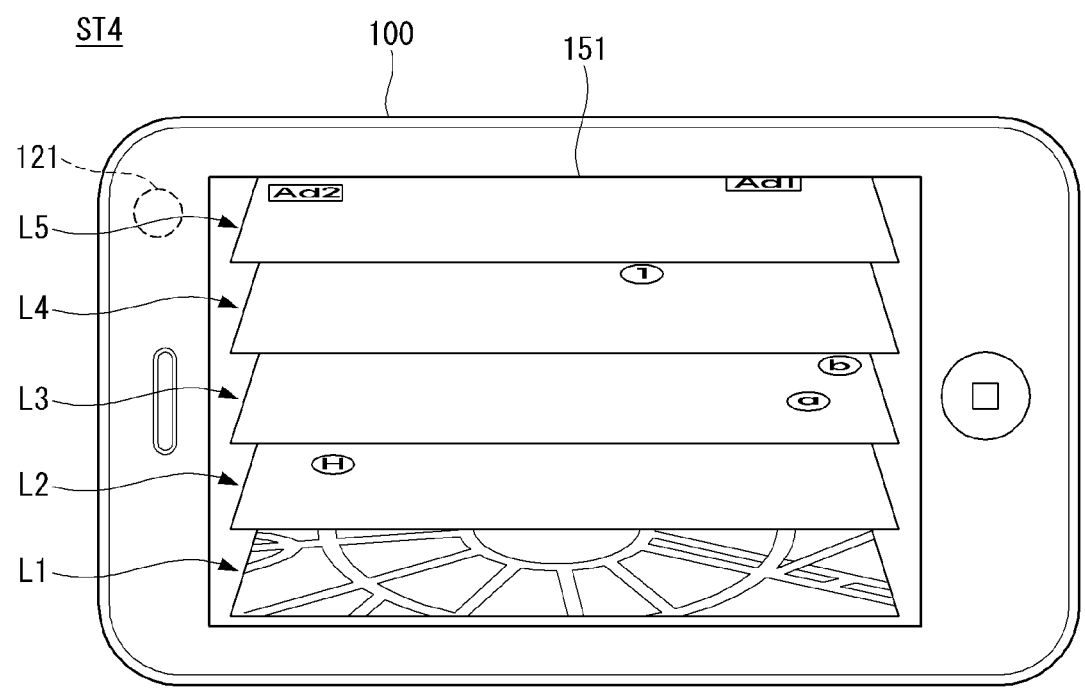
FIGS. 15 to 17 are diagrams illustrating a process of selectively displaying specific information.
Figure 16:
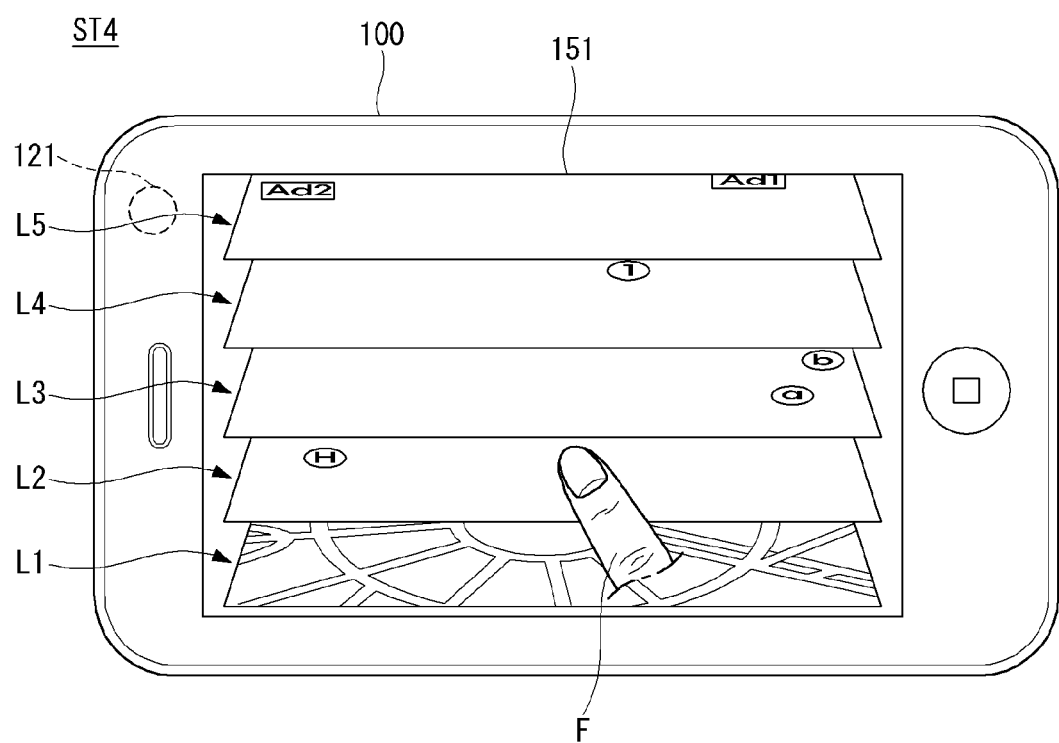
Figure 17:
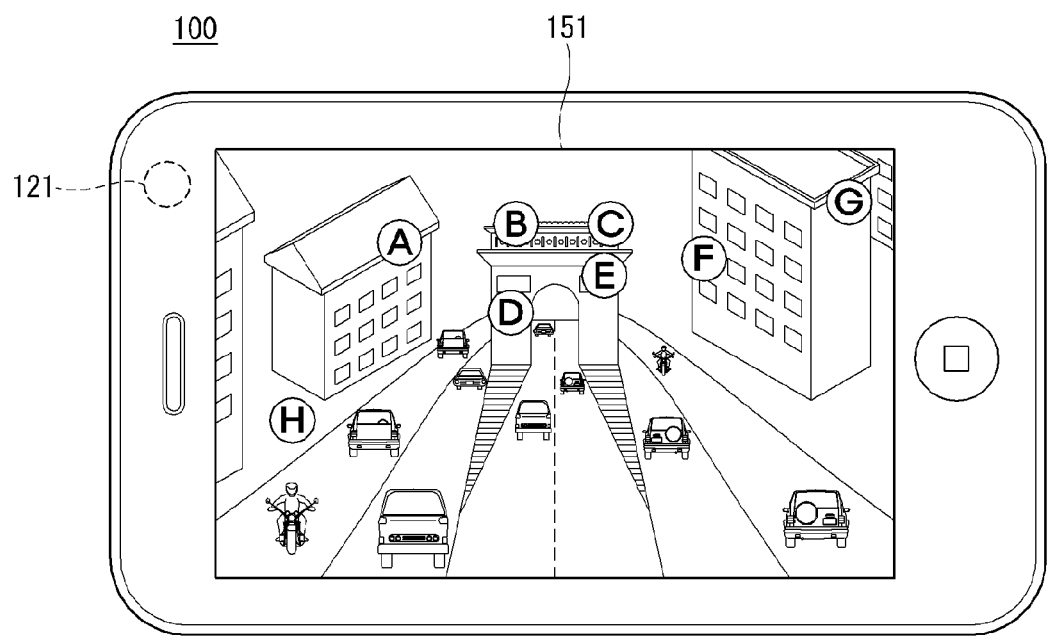

FIGS. 15 to 17 are diagrams illustrating a process of selectively displaying specific information.

As shown in FIG. 15, when the mobile terminal 100 is in the fourth state ST4, the controller 180 of the mobile terminal 100 according to an exemplary embodiment of the present invention controls to display each of the layers L1 to L5 in which the information AI is displayed. That is, when the mobile terminal 100 is in the first state ST1, the controller 180 controls to display an image photographed by the camera 121 and the acquired information AI, and when the mobile terminal 100 is in the fourth state ST4, the controller 180 forms the information AI into a group according to an attribute and controls to display the information AI in each of the layers L1 to L5.

When the display 151 displays a stereoscopic image using stereo disparity, each of the layers L1 to L5 is displayed so that the user receives a distance impression. For example, the third layer L3 may be displayed like being protruded to the front side further than other layers, or vice versa.

As shown in FIG. 16, the user can select a specific second layer L2 wishing to display using a finger F. That is, only information AI having a specific attribute among a large amount of information AI can be selectively displayed.

As shown in FIG. 17, the controller 180 controls the display 151 to display only information corresponding to the second layer L2 selected by the user. As an amount of the displayed information AI decreases, only information requested by the user is clearly displayed, compared with FIG. 9, which is a figure before grouping.

Figure 19:
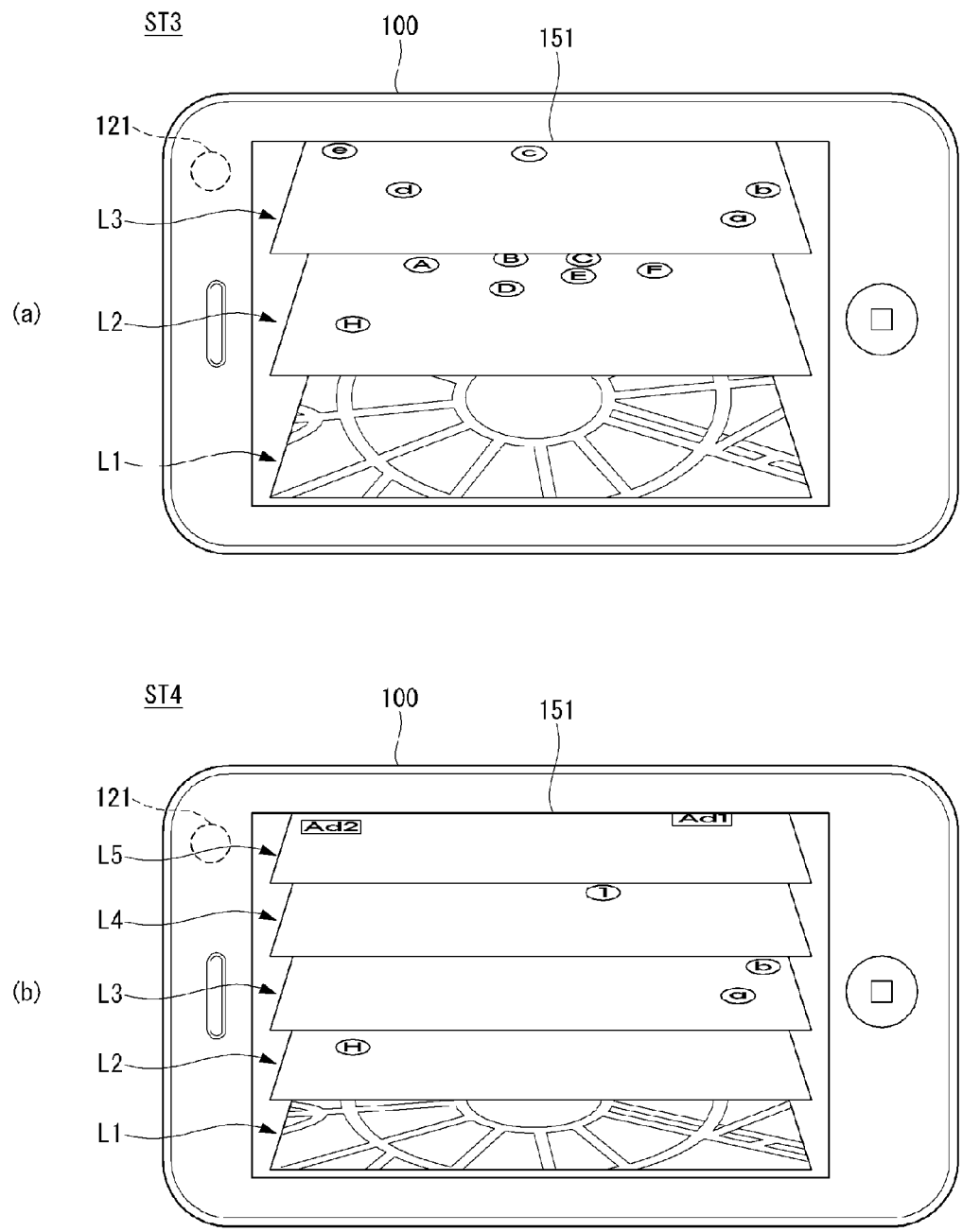

FIGS. 18 and 19 are diagrams illustrating a process of displaying a layer according to a motion of a body of a mobile terminal.

As shown in FIGS. 18 and 19, the controller 180 of the mobile terminal 100 according to an exemplary embodiment of the present invention can change the quantity of layers L displayed according to a tilt of the mobile terminal 100.

As shown in FIG. 18(a), a large quantity of information AI can be displayed in the display 151.

As shown in FIG. 18(b), the user can allow the body of the mobile terminal 100 to be in the second state ST2 by tilting the body of the mobile terminal 100. As shown in FIG. 11, the second state ST2 is a state in which the body of the mobile terminal 100 is tilted a little toward the ground.

When the body of the mobile terminal 100 is in the second state ST2, the controller 180 controls the display 151 to display the layer L. In this case, the controller 180 controls to display only the first and second layers L1 and L2, which is a partial layer instead of an entire layer L.

As shown in FIG. 19(a), the user can allow the body of the mobile terminal 100 to be in the third state ST3 by some more tilting the body of the mobile terminal 100. As shown in FIG. 11, the third state ST3 is a state in which the body of the mobile terminal 100 is tilted some more toward the ground.

When the mobile terminal 100 is in the third state ST3, the controller 180 controls the display 151 to display some more layers L. That is, when the mobile terminal 100 is in the third state ST3, in the second state ST2 in which the first and second layers L1 and L2 are displayed, the third layer L3 is further displayed.

As shown in FIG. 19(b), the user can allow the body of the mobile terminal 100 to be in the fourth state ST4 by tilting some more the body of the mobile terminal 100. As shown in FIG. 11, the fourth state ST4 is a state in which the body of the mobile terminal 100 is tilted parallel to the ground.

When the body of the mobile terminal 100 is in the fourth state ST4, the controller 180 controls the display 151 to display a large number of layers L. That is, when the body of the mobile terminal 100 is in the fourth state ST4, in the third state ST3 in which the first, second, and third layers L1, L2, and L3 are displayed, the fourth and fifth layers 4 and 5 are further displayed. However, this does not mean the quantity of layers L in which the first to fifth layers L1 to L5 are displayed, and the quantity is an example.

Figure 20:
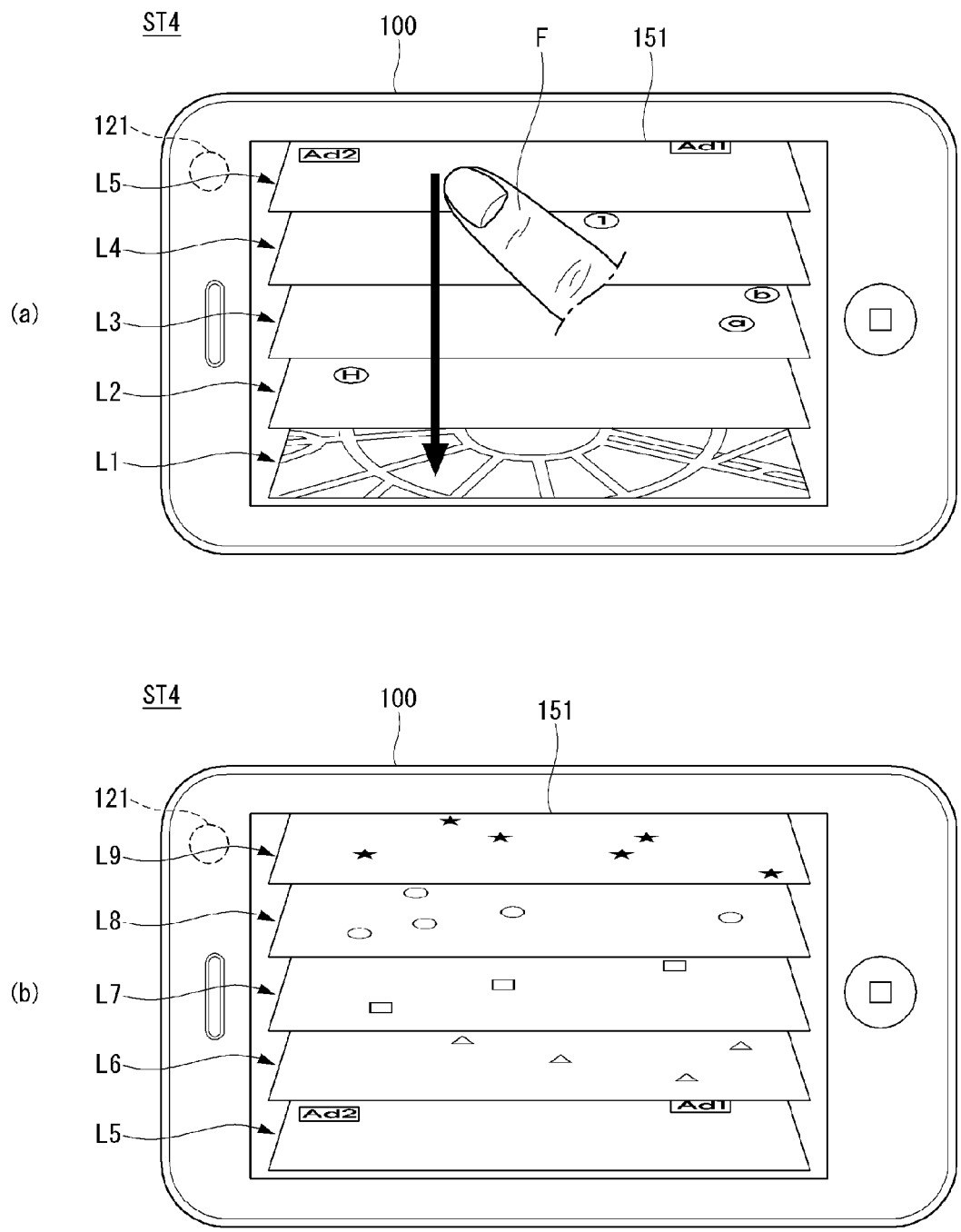
FIG. 20 is a diagram illustrating a process of converting display of a layer.

FIG. 20 is a diagram illustrating a process of converting display of a layer.

As shown in FIG. 20, the user can allow the display 151 to display a specific layer through a touch action.

As shown in FIG. 20(a), the user can perform a touch action of flicking the display 151 downward with a finger F.

As shown in FIG. 20(b), when the user performs a touch action of flicking the display 151, fifth to ninth layers L5 to L9 are displayed in the display 151. In this way, the user can allows the display 151 to display a desired layer by performing a flicking action downward or upward.

Figure 21:
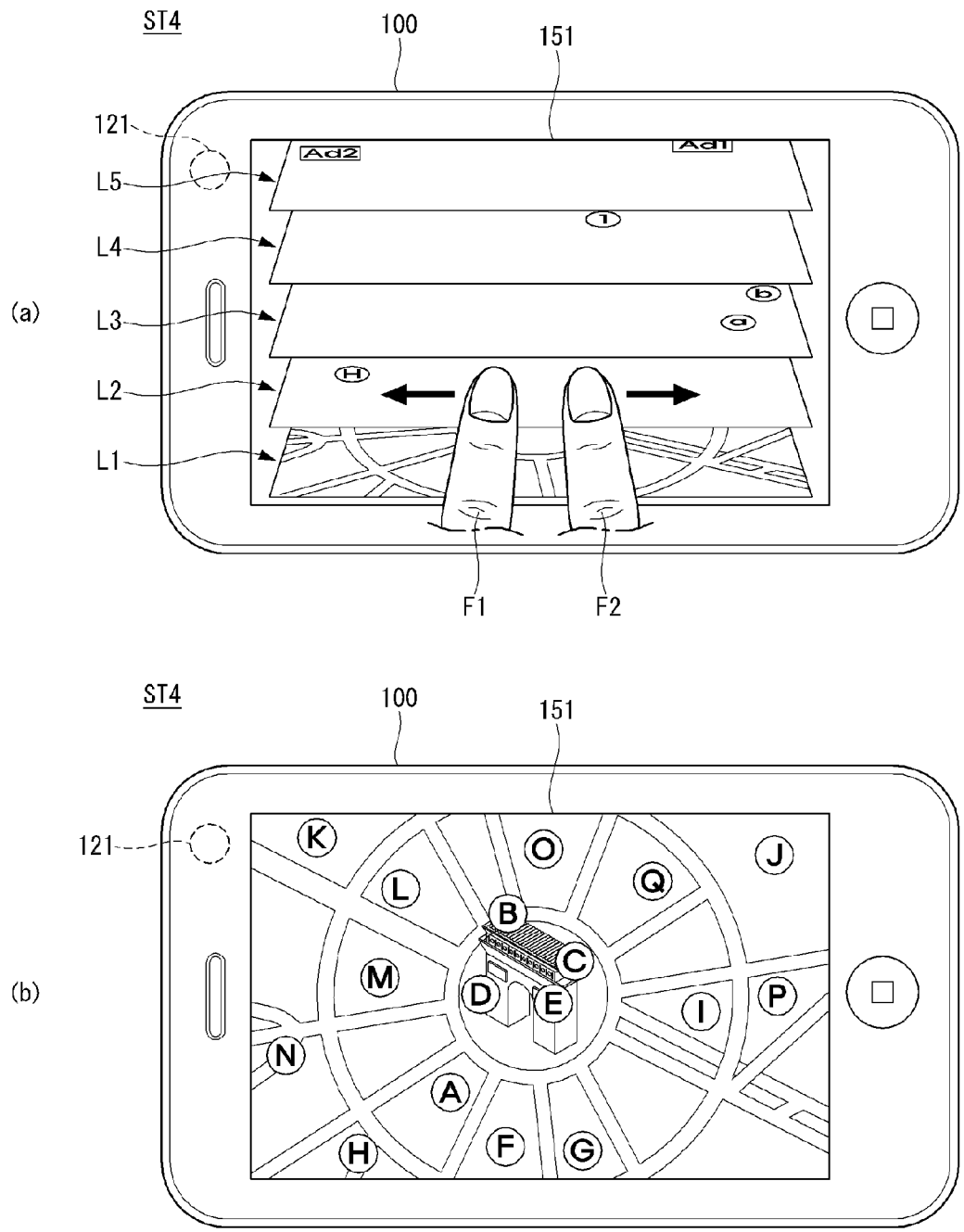
FIG. 21 is a diagram illustrating a process of selecting and displaying a specific layer.

FIG. 21 is a diagram illustrating a process of selecting and displaying a specific layer.

As shown in FIG. 21, the user can allow desired information to be displayed by selecting a specific layer L.

As shown in FIG. 21(a), the user can perform a multi-touch action in a specific second layer L2 of the displayed layers L using first and second fingers F1 and F2. That is, the user can perform a multi-touch action in a direction of receding from a specific location of the second layer L2.

As shown in FIG. 21(b), when the user performs a multi-touch action in the second layer L2, the first information (AT1 of FIG. 13) corresponding to the second layer L2 is displayed on a map. That is, the information AI is mapped and displayed at an actual position.

Figure 22:
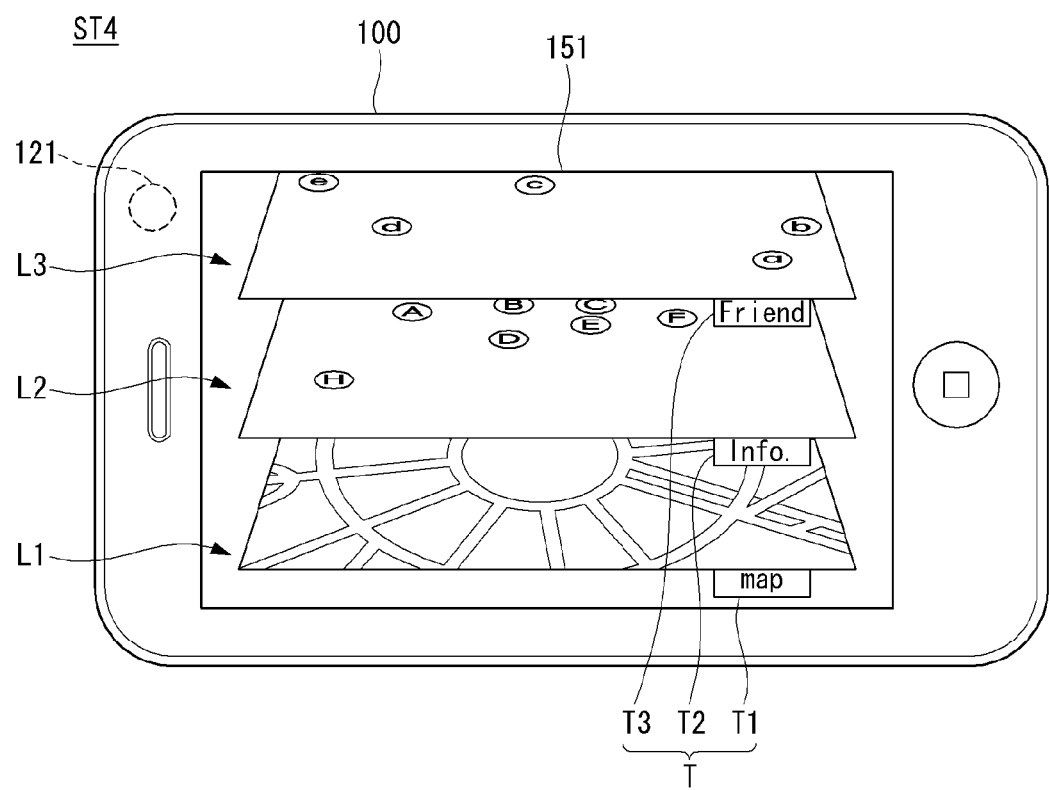
FIG. 22 is a diagram illustrating a layer to which a tap is added.

FIG. 22 is a diagram illustrating a layer to which a tap is added.

As shown in FIG. 22, a tap T is added to each layer L displayed in the display 151 of the mobile terminal 100.

The tap T reflects an attribute of each layer L. For example, as a map is added to the first tap T1 corresponding to the first layer L1, info is added to the second tap T2 corresponding to the second layer L2, and a friend is added to the third tap T3 corresponding to the third layer L3, the user can easily know an attribute of information AI formed into a group in each layer L.

Figure 24:
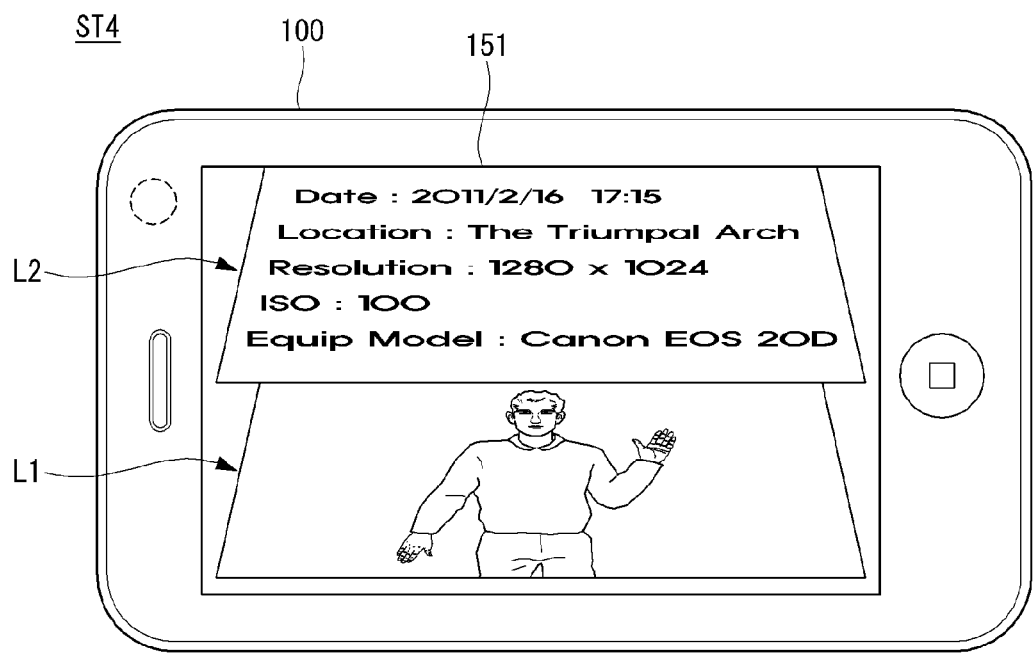

FIGS. 23 and 24 are diagrams illustrating operation of a mobile terminal according to another embodiment of the present invention.

As shown in FIGS. 23 and 24, the mobile terminal 100 according to another embodiment of the present invention displays information of various kinds of contents to correspond to a tilt of a body of the mobile terminal 100.

As shown in FIG. 23(a), a plurality of images PICs may be displayed in the display 151. A user can select a specific one of the displayed images PICs using a finger F.

As shown in FIG. 23(b), the selected image PIC is displayed in the display 151. In this case, the body of the mobile terminal 100 is in a first state ST1.

As shown in FIG. 24, when the user tilts the body of the mobile terminal 100 to a fourth state ST4, the first and second layers L1 and L2 are displayed.

The selected and displayed image PIC is displayed in the first layer L1.

Information related to the displayed image PIC is displayed in the second layer L2. However, the first and second layers L1 and L2 is an example, and various layers and information can be displayed.

When the user restores the body of the mobile terminal 100 to the first state ST1, the image PIC shown in FIG. 23(b) is again displayed.

When the body of the mobile terminal 100 is tilted, related information corresponding to the tilt is displayed and thus the user can easily know necessary information without a separate additional manipulation.

Figure 25:
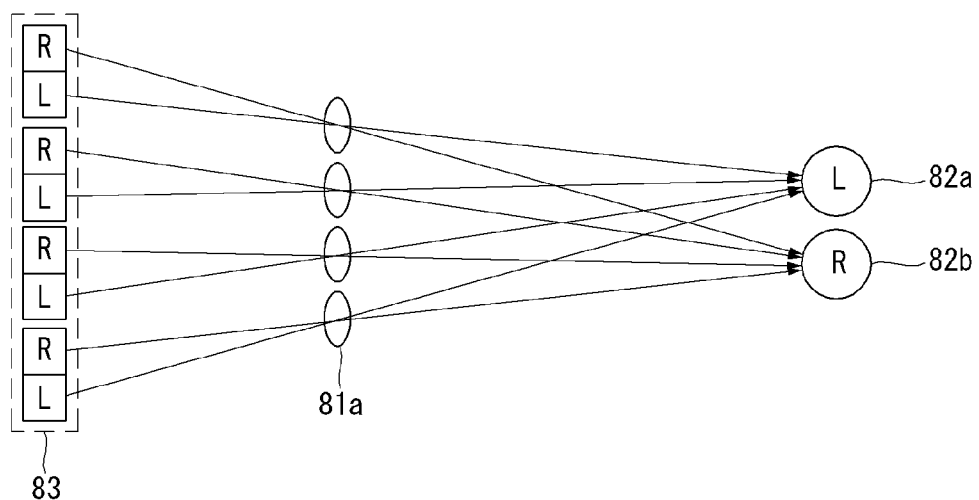
FIGS. 25 and 26 are views for explaining a method for displaying a stereoscopic image by using a binocular parallax according to an exemplary embodiment of the present invention.
Figure 26:
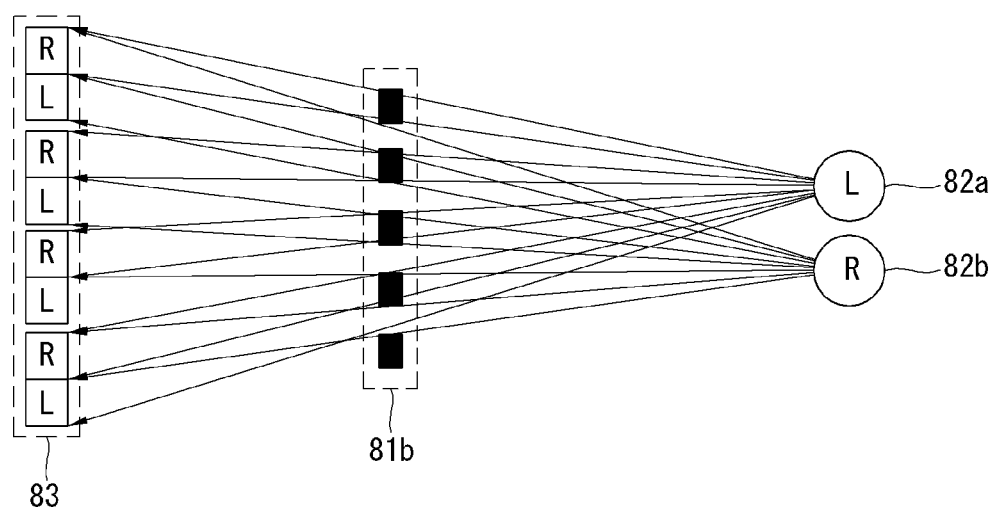

FIGS. 25 and 26 are views illustrating a method for displaying a stereoscopic image using binocular parallax according to an exemplary embodiment of the present invention. Specifically, FIG. 25 shows a scheme using a lenticular lens array, and FIG. 26 shows a scheme using a parallax barrier.

Binocular parallax (or stereo disparity) refers to the difference in vision of viewing an object between a human being's (user's or observer's) left and right eyes. When the user's brain combines an image viewed by the left eye and that viewed by the right eye, the combined image makes the user feel stereoscopic. Hereinafter, the phenomenon in which the user feels stereoscopic according to binocular parallax will be referred to as a 'stereoscopic vision', and an image causing a stereoscopic vision will be referred to as a 'stereoscopic image'. Also, when a particular object included in an image causes the stereoscopic vision, the corresponding object will be referred to as a 'stereoscopic object'.

A method for displaying a stereoscopic image according to binocular parallax is classified into a glass type method and a glassless type method. The glass type method may include a scheme using tinted glasses having a wavelength selectivity, a polarization glass scheme using a light blocking effect according to a deviation difference, and a time-division glass scheme alternately providing left and right images within a residual image time of eyes. Besides, the glass type method may further include a scheme in which filters each having a different transmittance are mounted on left and right eyes and a cubic effect with respect to a horizontal movement is obtained according to a time difference of a visual system made from the difference in transmittance.

The glassless type method, in which a cubic effect is generated from an image display surface, rather than from an observer, includes a parallax barrier scheme, a lenticular lens scheme, a microlens array scheme, and the like.

With reference to FIG. 25, in order to display a stereoscopic image, a display module 151 includes a lenticular lens array 81a. The lenticular lens array 81a is positioned between a display surface 81 on which pixels (L) to be input to a left eye 82a and pixels (R) to be input to a right eye 82b are alternately arranged along a horizontal direction, and the left and right eyes 82a and 82b, and provides an optical discrimination directionality with respect to the pixels (L) to be input to the left eye 82a and the pixels (R) to be input to the right eye 82b. Accordingly, an image which passes through the lenticular lens array 81a is separated by the left eye 82a and the right eye 82b and thusly observed, and the user's brain combines (or synthesizes) the image viewed by the left eye 82a and the image viewed by the right eye 82b, thus allowing the user to observe a stereoscopic image.

With reference to FIG. 26, in order to display a stereoscopic image, the display module 151 includes a parallax barrier 81b in the shape of a vertical lattice. The parallax barrier 81b is positioned between a display surface 81 on which pixels (L) to be input to a left eye 82a and pixels (R) to be input to a right eye 82b are alternately arranged along a horizontal direction, and the left and right eyes 82a and 82b, and allows images are separately observed at the left eye 82a and the right eye 82b. Accordingly, the user's brain combines (or synthesizes) the image viewed by the left eye 82a and the image viewed by the right eye 82b, thus allowing the user to observe a stereoscopic image. The parallax barrier 81b is turned on to separate incident vision only in the case of displaying a stereoscopic image, and when a planar image is intended to be displayed, the parallax barrier 81b may be turned off to allow the incident vision to pass therethrough without being separated.

Meanwhile, the foregoing methods for displaying a stereoscopic image are merely for explaining exemplary embodiments of the present invention, and the present invention is not meant to be limited thereto. Beside the foregoing methods, a stereoscopic image using binocular parallax may be displayed by using various other methods.

Figure 27:
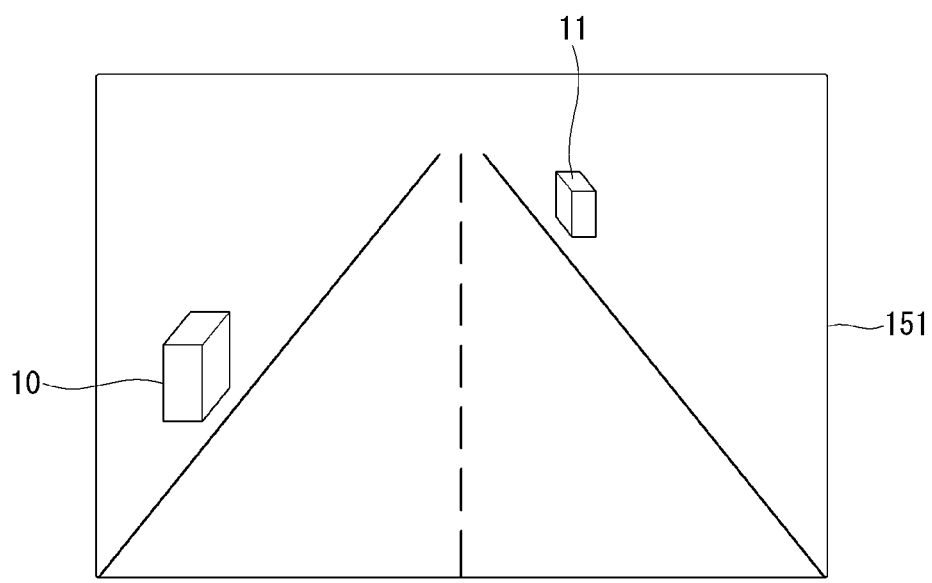
FIGS. 27 through 30 are views for explaining a method for displaying a stereoscopic image.

FIG. 27 illustrates an example of a stereoscopic image including a plurality of image objects 10 and 11.

For example, the stereoscopic image depicted in FIG. 27 may be an image obtained by the camera 121. The stereoscopic image includes a first image object 10 and a second image object 11. Here, it is assumed that there are two image objects 10 and 11 for ease of description; however, in actuality, more than two image objects may be included in the stereoscopic image.

The controller 180 may display an image acquired in real time by the camera 121 on the display 151 in the form of a preview.

The controller 180 may acquire one or more stereo disparities respectively corresponding to one or more of the image objects in operation.

In the case where the camera 121 is a 3D camera capable of acquiring an image for the left eye (hereinafter, referred to as "a left-eye image") and an image for the right eye (hereinafter, referred to as "a right-eye image"), the controller 180 may use the acquired left-eye and right-eye images to acquire the stereo disparity of each of the first image object 10 and the second image 11.

Figure 28:
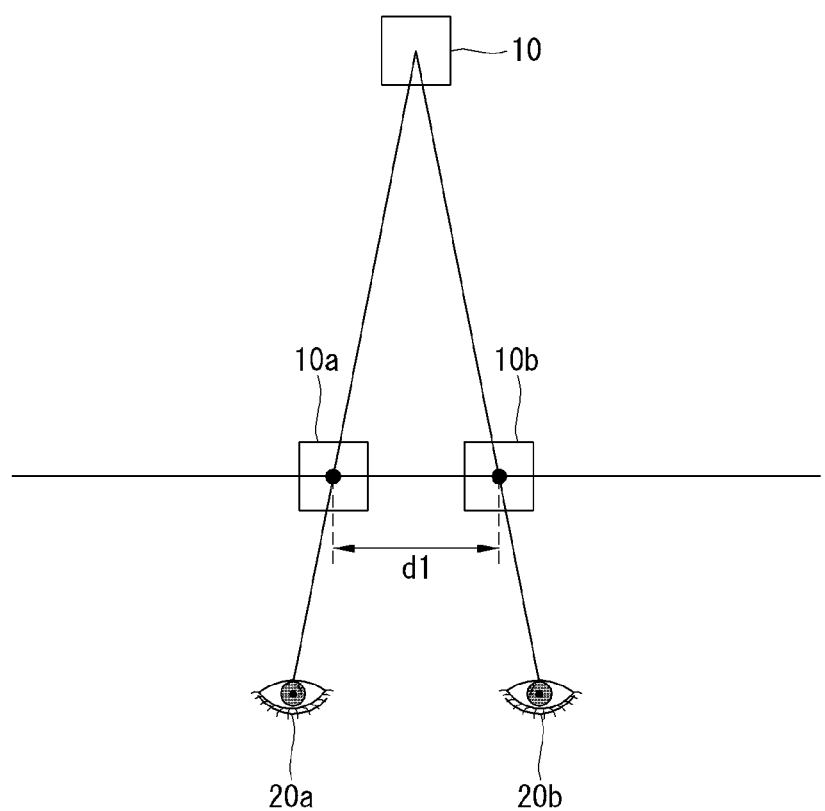

FIG. 28 is a view for explaining a stereo disparity of an image object included in a stereoscopic image.

For example, referring to FIG. 28, the first image object 10 may have a left-eye image 10a presented to the user's left eye 20a, and a right-eye image 10b presented to the right eye 20b.

The controller 180 may acquire a stereo disparity d1 corresponding to the first image object 10 on the basis of the left-eye image 10a and the right-eye image 10b.

In the case where the camera 121 is a 2D camera, the controller 180 may convert a 2D image, acquired by the camera 121, into a stereoscopic image by using a predetermined algorithm for converting a 2D image into a 3D image, and display the converted image on the display 151.

Furthermore, by using left-eye and right-eye images created by the above image conversion algorithm, the controller 180 may acquire the respective stereo disparities of the first image object 10 and the second image object 11.

Figure 29:
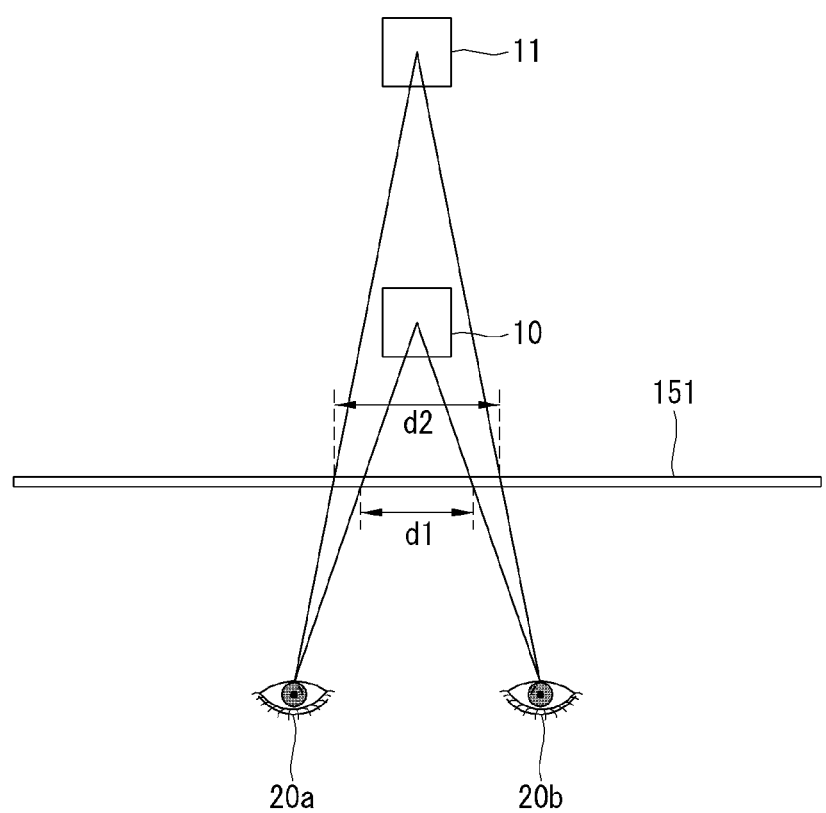

FIG. 29 is a view for comparing the stereo disparities of the image objects 10 and 11 depicted in FIG. 27.

Referring to FIG. 29, the stereo disparity d1 of the first image object 10 is different from a stereo disparity d2 of the second image object 11. Furthermore, as shown in FIG. 29, since the stereo disparity d2 of the second image object 11 is greater than the stereo disparity d1 of the first image object 10, the second image object 11 is viewed as if being located farther away from the user than the first image object 10.

The controller 180 may acquire one or more graphic objects respectively corresponding to one or more of the image objects in operation. The controller 180 may display the acquired one or more graphic objects on the display 151 so as to have a stereo disparity.

Figure 30:
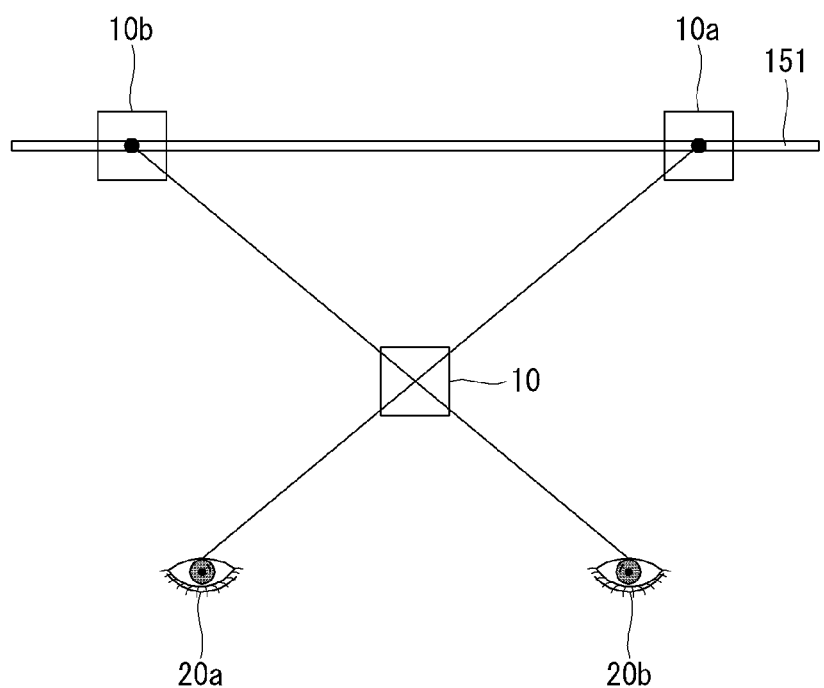

FIG. 30 illustrates the first image object 10 that may look as if protruding toward the user. As shown in FIG. 30, the locations of the left-eye image 10a and the right-eye image 10b on the display 151 may be opposite to those depicted in FIG. 28. When the left-eye image 10 and the right-eye image 10b are displayed in the opposite manner as above, the images are also presented to the left eye 20a and the right eye 20b in the opposite manner. Thus, the user can view the displayed image as if it is located in front of the display 151, that is, at the intersection of sights. That is, the user may perceive positive (+) depth in relation to the display 151. This is different from the case of FIG. 28 in which the user perceives negative (−) depth that gives the user an impression that the first image object 10 is displayed at the rear of the display 151.

The controller 180 may give the user the perception of various types of depth by displaying a stereoscopic image having positive (+) or negative depth (−) according to needs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a body;
a sensing unit configured to acquire a motion of the body;
a camera provided in at least one side of the body to photograph an image;
at least one display provided in at least one side of the body; and
a controller configured to form information related to at least one object included in the photographed image into a group according to the acquired motion and control to display the information in the at least one display,
wherein the controller is configured to control to selectively display at least one layer for displaying information formed into the group according to an angle between a ground and the body.

2. The mobile terminal of claim 1, wherein the motion of the body comprises at least one of an angle in which the body is tilted in a specific direction to a reference position and a time period in which a tilt of the body is sustained in the specific direction.

3. The mobile terminal of claim 2, wherein the reference position is a state in which the camera faces toward the front side.

4. The mobile terminal of claim 1, wherein the controller controls to display an image photographed by the camera when the body is in a state of a first angle from the ground and to divide and display information related to the object to the at least one layer according to an attribute of the object when the body is in a state of a second angle from the ground.

5. The mobile terminal of claim 1, wherein the controller increases the quantity of layers as an angle in which the body forms with the ground reduces.

6. The mobile terminal of claim 1, wherein the controller inactivates the camera when the layer is displayed.

7. The mobile terminal of claim 1, further comprising a radio communication unit for acquiring the information,
wherein the controller acquires the information corresponding to at least one object included in an image photographed through the camera through the radio communication unit.

8. The mobile terminal of claim 7, wherein the controller controls to overlap and display the information acquired through the radio communication unit with an image photographed by the camera and to display the information at a position corresponding to geography information tagged to the acquired information.

9. The mobile terminal of claim 1, wherein, when at least one layer is selected, the controller is configured to display information group corresponding to the selected at least one layer.

10. The mobile terminal of claim 1, wherein the controller is configured to change a position of at least one layer from a first position to a second position, wherein the first position is an initial position of the at least one layer and the second position is a corresponding position received by a user's touch input.

11. The mobile terminal of claim 1, wherein the controller is configured to display attribute information to each of the at least one layer, the attribute information reflects an attribute of information group.

12. A mobile terminal comprising:
a body;
a sensing unit configured to acquire a motion of the body;

a camera provided in at least one side of the body to photograph an image;
at least one display provided in at least one side of the body; and
a controller configured to display a plurality of objects included in the photographed image into at least one group according to an attribute of the plurality of objects when a motion of the body is acquired through the sensing unit,
wherein the controller is configured to control to selectively display at least one layer for displaying information formed into the group according to an angle between a ground and the body.

13. The mobile terminal of claim 12, further comprising:
a camera provided in at least one side of the body; and
a radio communication unit for acquiring the information,
wherein the controller acquires information corresponding to at least one object included in an image photographed by the camera through the radio communication unit.

14. A method of controlling a mobile terminal, the method comprising:
acquiring an image;
acquiring information related to an object included in the image; and
forming and displaying, when a motion of a body is detected, information related to at least one object included in a photographed image into a group according to the acquired motion,
wherein the forming and displaying of information comprises selectively displaying at least one layer for displaying information formed into a group according to the motion reflecting an angle of the body to the ground.

15. The method of claim 14, wherein the motion of the body comprises at least one of an angle in which the body is tilted in a specific direction to a reference position and a time period in which a tilt of the body is sustained in the specific direction.

16. The method of claim 14, wherein the selectively displaying of at least one layer comprises increasing the quantity of layers as an angle in which the body forms with the ground reduces.

17. The method of claim 14, further comprising stopping acquisition of the image when the layer is displayed.

* * * * *